United States Patent
Utsunomiya et al.

(10) Patent No.: US 10,220,604 B2
(45) Date of Patent: Mar. 5, 2019

(54) SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

(71) Applicant: SEIKO EPSON CORPORATION, Tokyo (JP)

(72) Inventors: Kohei Utsunomiya, Nagano (JP); Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 14/978,255

(22) Filed: Dec. 22, 2015

(65) Prior Publication Data

US 2016/0243758 A1 Aug. 25, 2016

(30) Foreign Application Priority Data

Feb. 19, 2015 (JP) .................................. 2015-030330

(51) Int. Cl.
| | | |
|---|---|---|
| *B44C 1/17* | (2006.01) | |
| *B33Y 30/00* | (2015.01) | |
| *B33Y 10/00* | (2015.01) | |
| *B29C 64/112* | (2017.01) | |
| *B29C 35/08* | (2006.01) | |

(52) U.S. Cl.
CPC ............ *B33Y 30/00* (2014.12); *B29C 64/112* (2017.08); *B33Y 10/00* (2014.12); *B29C 2035/0827* (2013.01)

(58) Field of Classification Search
CPC .............................. B29C 64/112; B33Y 10/00
See application file for complete search history.

(56) References Cited

U.S. PATENT DOCUMENTS

| | | | |
|---|---|---|---|
| 6,306,467 B1 * | 10/2001 | White ..................... C23C 4/123 | |
| | | | 427/470 |
| 6,612,824 B2 | 9/2003 | Tochimoto et al. | |
| 7,406,361 B2 | 7/2008 | Ohmori et al. | |
| 8,455,846 B2 | 6/2013 | Gates et al. | |
| 2004/0141018 A1 * | 7/2004 | Silverbrook ............ B22F 3/008 | |
| | | | 347/4 |
| 2005/0015173 A1 | 1/2005 | Ohmori et al. | |
| 2010/0294954 A1 | 11/2010 | Gates et al. | |
| 2014/0162033 A1 * | 6/2014 | Giller .................. B29C 67/0059 | |
| | | | 428/207 |

(Continued)

FOREIGN PATENT DOCUMENTS

| | | |
|---|---|---|
| JP | 2000-280354 A | 10/2000 |
| JP | 2010-000808 A | 1/2008 |

(Continued)

*Primary Examiner* — William P Bell
*Assistant Examiner* — Andrew L Swanson

(57) ABSTRACT

A solid object shaping apparatus, which includes a head unit that ejects a liquid, and a curing unit that cures the liquid so as to form a block, shapes a solid object by using the blocks, and can cure the liquid in a plurality of curing modes including a first curing mode in which the liquid is cured so that the block with a first size is formed by a first reference amount of liquid, and a second curing mode in which the liquid is cured so that the block with a second size in which a surface area is larger than a surface area in the first size is formed by using the first reference amount of liquid.

5 Claims, 18 Drawing Sheets

(56) References Cited

U.S. PATENT DOCUMENTS

2015/0093544 A1* 4/2015 Van De Vrie ....... B29C 67/0059
                                                    428/156
2016/0001549 A1* 1/2016 Kubo ................... B41J 2/04536
                                                     347/9
2016/0221262 A1* 8/2016 Das .................... G03F 7/70416

FOREIGN PATENT DOCUMENTS

JP      2014-111385 A    6/2014
WO      03/016031 A1     2/2003

* cited by examiner

| DOT SIZE | SI[m] (b1, b2) | Sel[m] | |
|---|---|---|---|
| | | Ts1 | Ts2 |
| LARGE DOT | (1, 1) | H | H |
| SMALL DOT | (1, 0) | H | L |
| NON-RECORDING | (0, 0) | L | L |

SOLID OBJECT

SECTION OF SOLID OBJECT

SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

This application claims priority to Japanese Patent Application No. 2015-030330 filed on Feb. 19, 2015. The entire disclosure of Japanese Patent Application No. 2015-030330 is hereby incorporated herein by reference.

BACKGROUND

1. Technical Field

The present invention relates to a solid object shaping apparatus, a control method for the solid object shaping apparatus, and a control program for the solid object shaping apparatus.

2. Related Art

In recent years, various solid object shaping apparatuses such as 3D printers have been proposed. The solid object shaping apparatus forms a dot with a predetermined size by ejecting a liquid such as ink, and shapes a solid object by using a plurality of dots (for example, JP-A-2000-280354).

Meanwhile, since a solid object shaped by the solid object shaping apparatus is shaped as a set of dots each having a predetermined size, irregularities of a surface of the solid object may be visually recognized and may thus cause a rough texture.

SUMMARY

An advantage of some aspects of the invention is to provide a solid object shaping apparatus capable of shaping a solid object which does not cause a rough texture by reducing the possibility that irregularities may be visually recognized.

According to an aspect of the invention, there is provided a solid object shaping apparatus including a head unit that ejects a liquid; and a curing unit that cures the liquid ejected from the head unit, in which a block is formed by using the cured liquid, and a solid object is shaped by using the plurality of blocks, and in which the curing unit can cure the liquid in a plurality of curing modes including a first curing mode in which the liquid is cured so that the block with a first size is formed by a first reference amount of liquid ejected from the head unit, and a second curing mode in which the liquid is cured so that the block with a second size in which a surface area is larger than a surface area in the first size is formed by the first reference amount of liquid ejected from the head unit.

According to the aspect of the invention, it is possible to form blocks with different sizes such as a block with a first size (hereinafter, referred to as a "first block") and a block with a second size (hereinafter, referred to as a "second block") by using the first reference amount of liquid. In other words, according to the aspect of the invention, it is possible to control the size of a block by changing the extent of curing when the liquid is cured.

For this reason, it is possible to finely adjust the size of a block compared with a case where the size of a block cannot be adjusted on the basis of the extent of curing of a liquid, and, for example, the size of the block is controlled only on the basis of an amount of liquid to be ejected. Consequently, it is possible to make irregularities of a surface of a solid object invisible and thus to shape the solid object having a smooth surface with less roughness.

A liquid for forming a block may be a liquid which is ejected through one ejection operation of the head unit, and may be a liquid which is ejected for a plurality of times through a plurality of ejection operations of the head unit. In other words, in a case where a dot is formed by curing a liquid which is ejected through one ejection operation of the head unit, the block may be formed by using a single dot, and may be formed by using a plurality of dots. In this case, each dot may be formed by using only a liquid ejected from the head unit, and may include an object other than the liquid, for example, powders which are provided in advance at a position where the liquid is ejected, in addition to the liquid ejected from the head unit. The powders may be ones which are hardened by curing the liquid.

In the solid object shaping apparatus, preferably, in a case where a model for designating a shape of the solid object is approximated with a voxel assembly constituted of a plurality of voxels each of which is a virtual rectangular parallelepiped with the first size, the block formed by using the liquid cured in the second curing mode is formed in a voxel in which two or more faces of six faces of the voxel are adjacent to an upper face of a first edge voxel constituting a surface of the voxel assembly, and in a part of the first edge voxel, among the plurality of voxels constituting the voxel assembly.

According to the aspect, the second block with the size larger than that of the voxel is provided in a voxel (hereinafter, referred to as an "adjacent voxel") which is adjacent to an upper side of the first edge voxel and a part of the first edge voxel. The first edge voxel is a voxel whose lower face constitutes the surface of the solid object and is located at an edge portion of a location directed downward on the surface of the solid object. That is, according to this aspect, a block with the size smaller than that of the first edge voxel can be regarded to be provided in the first edge voxel located at the edge portion of the surface of the solid object.

For this reason, the edge portion can be made invisible compared with a case where a block is formed in the entire first edge voxel, and thus it is possible to reduce irregularities of the surface of the solid object. As a result, it is possible to minimize the possibility that the irregularities may be visually recognized or may be recognized with a tactile sense.

In the solid object shaping apparatus, preferably, the head unit can eject the first reference amount of liquid or a second reference amount of liquid smaller than the first reference amount of liquid in a case where the block is formed, and, in a case where a model for designating a shape of the solid object is approximated with a voxel assembly constituted of a plurality of voxels each of which is a virtual rectangular parallelepiped with the first size, a block formed by using the second reference amount of liquid is provided in a part of a second edge voxel in which two or more faces of six faces of the voxel constitute a surface of the voxel assembly among the plurality of voxels constituting the voxel assembly.

According to the aspect, a block is formed in the second edge voxel by using the second reference amount of liquid smaller than an amount of liquid for forming a block with the first size in the first curing mode. The second edge voxel is a voxel whose upper face constitutes the surface of the solid object and is located at an edge portion of a location directed upward on the surface of the solid object. That is, according to this aspect, a block with the size smaller than that of the second edge voxel can be provided in the second edge voxel located at the edge portion of the surface of the solid object. For this reason, the edge portion can be made invisible compared with a case where a block is formed in the entire second edge voxel, and thus it is possible to reduce irregularities of the surface of the solid object. As a result, it is possible to minimize the possibility that the irregularities may be visually recognized or may be recognized with a tactile sense.

In the solid object shaping apparatus, preferably, the liquid is cured when irradiated with light having a predetermined wavelength, the curing unit can irradiate the liquid ejected from the head unit with the light having the predetermined wavelength, and the intensity of light applied by the curing unit in the first curing mode is higher than the intensity of light applied by the curing unit in the second curing mode.

According to the aspect, it is possible to control the extent of curing of the liquid by using the intensity of light. In other words, it is possible to adjust a block size by using the intensity of light. For this reason, when compared with a case where a block size cannot be adjusted by using the intensity of light, it is possible to finely adjust a block size and thus to shape a solid object having a smooth surface with less roughness.

The light having the predetermined wavelength may be light with which a liquid can be cured. For example, in a case where a liquid is an ultraviolet curable resin, the light having the predetermined wavelength is ultraviolet rays.

In the solid object shaping apparatus, preferably, the liquid is cured by being heated, the curing unit can heat the liquid ejected from the head unit, and the amount of heat applied to the liquid ejected from the head unit by the curing unit in the first curing mode is larger than the amount of heat applied to the liquid ejected from the head unit by the curing unit in the second curing mode.

According to the aspect, it is possible to control the extent of curing of the liquid by using an amount of heat applied to the liquid. In other words, it is possible to adjust a block size by using an amount of heat applied to the liquid. For this reason, when compared with a case where a block size cannot be adjusted by using an amount of heat applied to the liquid, it is possible to finely adjust a block size and thus to shape a solid object having a smooth surface with less roughness.

In the solid object shaping apparatus, preferably, time to cure the liquid ejected from the head unit by the curing unit in the first curing mode is longer than time to cure the liquid ejected from the head unit by the curing unit in the second curing mode.

According to the aspect, it is possible to control the extent of curing of the liquid by using time to cure the liquid. In other words, it is possible to adjust a block size by using time to cure the liquid. For this reason, when compared with a case where a block size cannot be adjusted by using time to cure the liquid, it is possible to finely adjust a block size and thus to shape a solid object having a smooth surface with less roughness.

According to another aspect of the invention, there is provided a control method for a solid object shaping apparatus which includes a head unit that ejects a liquid; and a curing unit that cures the liquid ejected from the head unit, and which forms a block by using the cured liquid, and shapes a solid object by using the plurality of blocks, the method including curing the liquid ejected from the head unit in any one of a plurality of curing modes including a first curing mode in which the liquid is cured so that the block with a first size is formed by a first reference amount of liquid ejected from the head unit, and a second curing mode in which the liquid is cured so that the block with a second size larger than the first size is formed by using the first reference amount of liquid ejected from the head unit.

According to the aspect of the invention, it is possible to control the size of a block by changing the extent of curing when the liquid is cured. For this reason, it is possible to finely adjust the size of a block compared with a case where the size of a block cannot be adjusted on the basis of the extent of curing of a liquid, and thus to shape a solid object having a smooth surface with less roughness.

According to still another aspect of the invention, there is provided a control program for a solid object shaping apparatus which includes a head unit that ejects a liquid; a curing unit that cures the liquid ejected from the head unit; and a computer, and which forms a block by using the cured liquid, and shapes a solid object by using the plurality of blocks, the program causing the computer to function as a control portion that controls the curing unit to cure the liquid ejected from the head unit in any one of a plurality of curing modes including a first curing mode in which the liquid is cured so that the block with a first size is formed by a first reference amount of liquid ejected from the head unit, and a second curing mode in which the liquid is cured so that the block with a second size in which a surface area is larger than a surface area in the first size is formed by the first reference amount of liquid ejected from the head unit.

According to the aspect of the invention, it is possible to control the size of a block by changing the extent of curing when the liquid is cured. For this reason, it is possible to finely adjust the size of a block compared with a case where the size of a block cannot be adjusted on the basis of the extent of curing of a liquid, and thus to shape a solid object having a smooth surface with less roughness.

BRIEF DESCRIPTION OF THE DRAWINGS

The invention will be described with reference to the accompanying drawings, wherein like numbers reference like elements.

FIGS. 2A to 2E are diagrams for explaining shaping of a solid object in the solid object shaping system.

DESCRIPTION OF EXEMPLARY EMBODIMENTS

Hereinafter, an embodiment of the invention will be described with reference to the drawings. However, a dimension and a scale of each part are different from actual ones as appropriate in each drawing. The embodiment described below is a preferred specific example of the invention and is thus added with technically preferred various limitations, but the scope of the invention is not limited to such an embodiment unless description for limiting the invention is made in the following description.

A. Embodiment

In the present embodiment, as a solid object shaping apparatus, a description will be made by exemplifying an ink jet type solid object shaping apparatus which ejects ultraviolet curable ink (an example of a "liquid") so as to shape a solid object Obj.

1. Configuration of Solid Object Shaping System

Hereinafter, with reference to FIGS. 1 to 9, a description will be made of a solid object shaping system 100 including a solid object shaping apparatus 1 according to the present embodiment.

Figure 1:
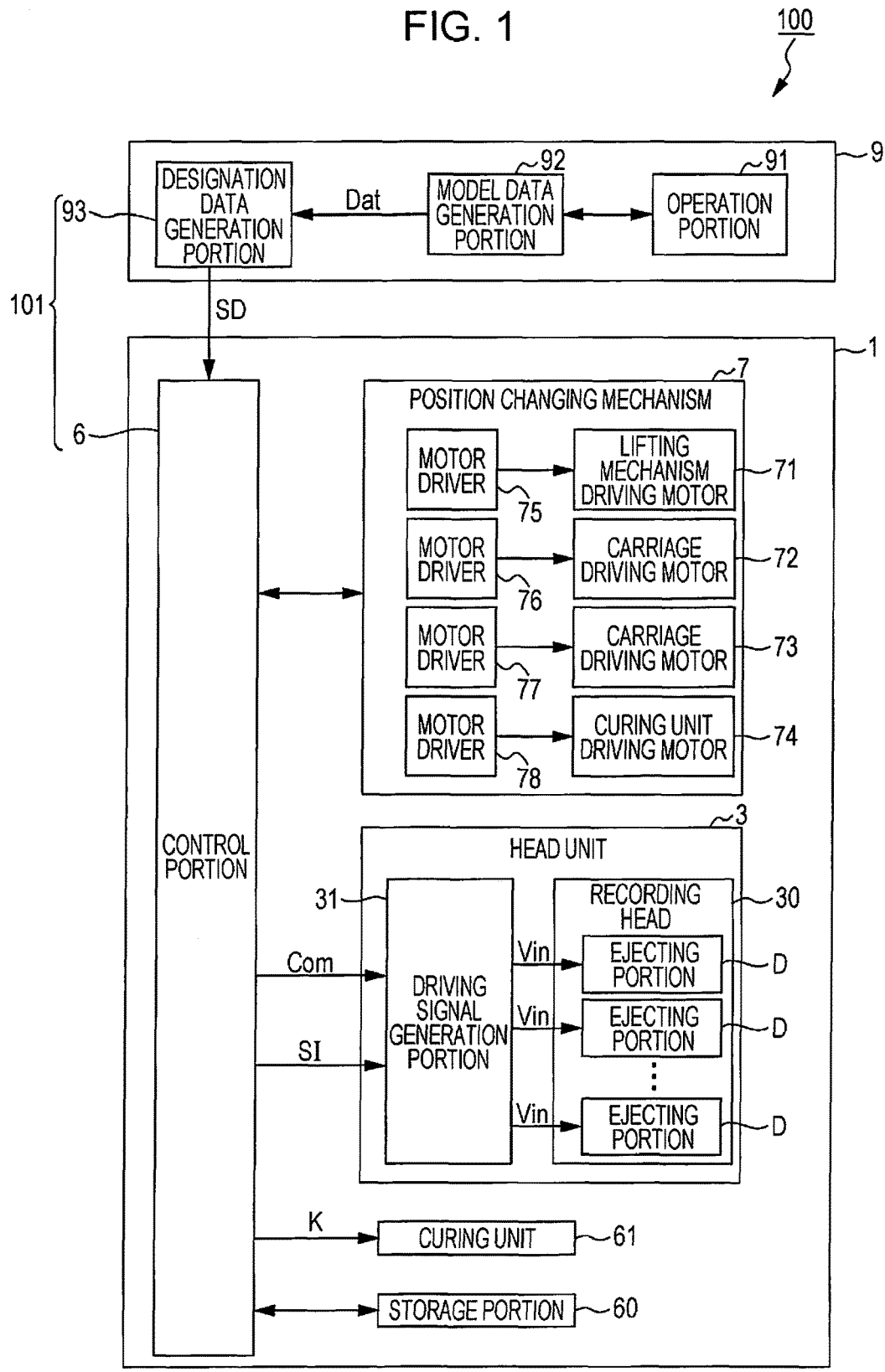
FIG. 1 is a block diagram illustrating a configuration of a solid object shaping system according to an embodiment of the invention.

FIG. 1 is a functional block diagram illustrating a configuration of the solid object shaping system 100.

As illustrated in FIG. 1, the solid object shaping system 100 includes the solid object shaping apparatus 1 and a host computer 9. The solid object shaping apparatus 1 performs a shaping process of ejecting ink, forming a layer-like shaping body LY (an example of a shaping layer) with a predetermined thickness ΔZ by using dots formed by the ejected ink, and shaping a solid object Obj by laminating the shaping body LY. The host computer 9 performs a data generation process of generating designation data SD designating a shape and a color of each of a plurality of shaping bodies LY constituting the solid object Obj shaped by the solid object shaping apparatus 1.

1.1 Host Computer

As illustrated in FIG. 1, the host computer 9 includes a CPU (not illustrated) which controls operations of respective portions of the host computer 9; a display portion (not illustrated) such as a display; an operation portion 91 such as a keyboard or a mouse; an information storage portion (not illustrated) which stores a control program for the host computer 9, a driver program for the solid object shaping apparatus 1, and application programs such as computer aided design (CAD) software; a model data generation portion 92 which generates model data Dat; and a designation data generation portion 93 which generates the data generation process of generating the designation data SD on the basis of the model data Dat.

Here, the model data Dat is data indicating a shape and a color of a model which represents the solid object Obj which is to be shaped by the solid object shaping apparatus 1, and designates a shape and a color of the solid object Obj. In the following description, it is assumed that a color of the solid object Obj includes a method of giving a plurality of colors in a case where the plurality of colors are given to the solid object Obj, that is, shapes, characters, and other images represented by the plurality of colors given to the solid object Obj.

The model data generation portion 92 is a functional block which is realized by the CPU of the host computer 9 executing the application programs stored in the information storage portion. The model data generation portion 92 is, for example, a CAD application, and generates the model data Dat indicating a model for representing a shape and a color of the solid object Obj on the basis of information or the like which is input by a user of the solid object shaping system 100 operating the operation portion 91.

In the present embodiment, it is assumed that the model data Dat designates an outer shape of the solid object Obj. In other words, it is assumed that the model data Dat designates a shape of a hollow object when the solid object Obj is assumed to be the hollow object, that is, a shape of an outer surface SF which is a contour of a model of the solid object Obj. For example, in a case where the solid object Obj is a sphere, the model data Dat designates a shape of a spherical surface which is a contour of the sphere.

However, the invention is not limited to such an aspect, and the model data Dat may include at least information which can specify a shape of an outer surface SF of a model of the solid object Obj.

For example, the model data Dat may be data for designating a more inner shape than the outer surface SF of the model of the solid object Obj or a material of the solid object Obj in addition to a shape of the outer surface SF of the model of the solid object Obj and a color of the solid object Obj.

The model data Dat may have a data format such as Additive Manufacturing File Format (AMF) or Standard Triangulated Language (STL).

The designation data generation portion 93 is a functional block which is realized by the CPU of the host computer 9 executing the driver program for the solid object shaping apparatus 1 stored in the information storage portion. The designation data generation portion 93 performs the data generation process of generating the designation data SD for designating a shape and a color of the shaping body LY formed by the solid object shaping apparatus 1 on the basis of the model data Dat generated by the model data generation portion 92.

In the following description, it is assumed that the solid object Obj is shaped by laminating Q layer-like shaping bodies LY (where Q is a natural number satisfying Q≥2). A process in which the solid object shaping apparatus 1 forms the shaping body LY is referred to as a laminate process. In other words, the shaping process in which the solid object shaping apparatus 1 shapes the solid object Obj includes Q laminate processes. Hereinafter, the shaping body LY formed in the q-th laminate process among the Q laminate processes included in the shaping process is referred to as a shaping body LY[q], and the designation data SD for designating a shape and a color of the shaping body LY[q] is referred to as designation data SD[q] (where q is a natural number satisfying 1≤q≤Q).

FIGS. 2A to 2E are diagrams for explaining a relationship between the shape of an outer surface SF of a model of the solid object Obj designated by the model data Dat, and the shaping body LY formed by using the designation data SD.

As illustrated in FIGS. 2A and 2B, in order to generate designation data SD[1] to SD[Q] designating shapes and colors of shaping bodies LY[1] to LY[Q] each having a predetermined thickness $\Delta Z$, the designation data generation portion 93 first slices the outer surface SF of the model having a three-dimensional shape indicated by the model data Dat for each predetermined thickness $\Delta Z$ so as to generate sectional model data Ldat[1] to Ldat[Q] corresponding to the shaping bodies LY[1] to LY[Q] with a one-to-one relationship. Here, the section model data Ldat is data indicating a shape and a color of a sectional body obtained by slicing the model having a three-dimensional shape indicated by the model data Dat. However, the section model data Ldat may include data indicating a shape and a color of a section obtained by slicing the model having a three-dimensional shape indicated by the model data Dat. FIG. 2A exemplifies the section model data Ldat[1] corresponding to the shaping body LY[1] formed in the first laminate process, and FIG. 2B exemplifies the section model data Ldat[2] corresponding to the shaping body LY[2] formed in the second laminate process.

Next, the designation data generation portion 93 determines the arrangement of dots to be formed by the solid object shaping apparatus 1 on the basis of a shape and a color indicated by the section model data Ldat[q] and outputs a determination result as the designation data SD. More specifically, the designation data generation portion 93 generates voxel data VD on the basis of the section model data Ldat, and generates the designation data SD on the basis of the voxel data VD. Hereinafter, regarding the voxel data VD, the voxel data VD generated on the basis of the section model data Ldat[q] is referred to as voxel data VD[q]. In other words, the designation data generation portion 93 generates the voxel data VD[q] on the basis of the section model data Ldat[q], and generates the designation data SD[q] on the basis of the voxel data VD[q].

Here, the voxel data VD[q] is data approximating and representing, as a set of voxels Vx, the shape and the color of the sectional body of the model of the solid object Obj indicated by the section model data Ldat[q], by subdividing the shape and the color of the sectional body of the model of the solid object Obj indicated by the section model data Ldat[q] in a lattice form.

The designation data SD[q] is data designating a color and the size of a dot for forming the shaping body LY[q] constituting the solid object Obj. In other words, the designation data SD is data designating a color and the size of a dot which is to be formed in order to shape the solid object Obj. For example, the designation data SD may designate a color of a dot depending on the type of ink used to form the dot. The type of ink will be described later.

The voxel Vx is a virtual rectangular parallelepiped which indicates a target position at which ink ejected by the solid object shaping apparatus 1 is landed and has a predetermined size, a predetermined thickness $\Delta Z$, and a predetermined volume. In the present embodiment, a volume and the size of the voxel Vx are determined in accordance with the size of a dot which can be formed by the solid object shaping apparatus 1. Hereinafter, a voxel Vx indicating a landing position of a dot provided to form the shaping body LY[q] in the q-th laminate process is referred to as a voxel Vxq in some cases.

In addition, hereinafter, a constituent element of the solid object Obj is referred to as a block BL, the constituent element being formed by ink which is landed on a single voxel Vx. As will be described later in detail, the block BL is constituted of one or a plurality of dots. In other words, the block BL is one or a plurality of dots formed by ink landed on a single voxel Vx.

Figure 14A:
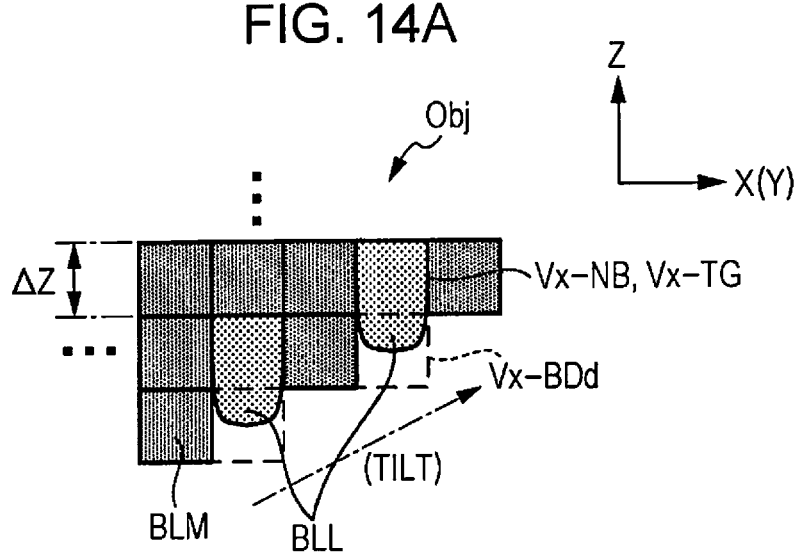
FIGS. 14A and 14B are diagrams for explaining a solid object.
Figure 14B:
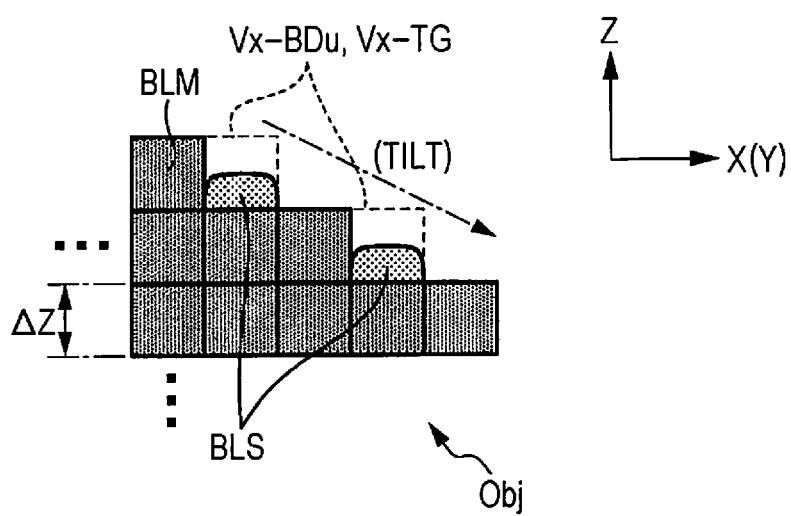

In the present embodiment, a case is assumed in which the solid object shaping apparatus 1 can form three types of blocks BL such as a normal block BLM, a large block BLL, and a small block BLS (refer to FIGS. 14A and 14B).

Here, the normal block BLM is a block BL having substantially the same size (an example of a "first size") as that of the voxel Vx; the small block BLS is a block BL having the size smaller than that of the voxel Vx; and the large block BLL is a block BL having the size (an example of a "second size") larger than that of the voxel Vx. In other words, the normal block BLM has a predetermined thickness $\Delta Z$, the small block BLS is thinner than the predetermined thickness $\Delta Z$, and the large block BLL is thicker than the predetermined thickness $\Delta Z$.

In the present specification, the expression such as "substantially the same" or "substantially uniform" includes not only a case of being completely uniform or the same but also a case of being regarded to be uniform or the same if various errors are ignored.

The normal block BLM and the small block BLS are provided inside a voxel Vx on which ink ejected from the solid object shaping apparatus 1 is landed. In contrast, the large block BLL is formed in a voxel Vx on which ink ejected from the solid object shaping apparatus 1 is landed and a part of a voxel Vx adjacent to the voxel Vx in the $-Z$ direction (hereinafter, referred to as a "lower side" in some cases).

Specifically, in a case where the normal block BLM is formed in one voxel Vx, the normal block BLM is formed to fill the one voxel Vx by ink ejected onto the one voxel Vx. In a case where the small block BLS is formed in one voxel Vx, the small block BLS is formed in a part of the one voxel Vx by ink ejected onto the one voxel Vx. In a case where the large block BLL is formed in one voxel Vx, the large block BLL is formed in the one voxel Vx and another voxel Vx adjacent to the one voxel Vx on the lower side thereof by ink ejected onto the one voxel Vx.

As mentioned above, the solid object shaping system 100 shapes a solid object Obj as a set of a plurality of blocks BL. That is, the solid object shaping system 100 represents a model of the solid object Obj indicated by the model data Dat as an assembly of a plurality of voxels Vx through subdivision in a lattice form, and shapes the solid object Obj by forming blocks BL in some or all of the plurality of voxels Vx. For this reason, from the microscopic viewpoint, a shape of the solid object Obj is different from a shape of the model of the solid object Obj indicated by the model data Dat. In other words, an outer surface SF of the model of the solid object Obj indicated by the model data Dat is different from a shape of a surface of the solid object Obj which is actually shaped by the solid object shaping apparatus 1 (refer to FIGS. 15A and 15B which will be described later). For example, even if a shape of the outer surface SF of the model indicated by the model data Dat is a smooth curve, a surface of the solid object Obj shaped by the solid object shaping apparatus 1 may have an irregular shape from the microscopic viewpoint.

Hereinafter, an assembly of a plurality of voxels Vx indicated by the voxel data VD, that is, an assembly of a plurality of voxels Vx for approximately representing a model of the solid object Obj indicated by the model data Dat through subdivision of the model in a lattice form is referred to as a "voxel assembly" in some cases.

As illustrated in FIGS. 2C and 2D, if the designation data SD[q] is supplied from the designation data generation portion 93, the solid object shaping apparatus 1 performs the laminate process of forming the shaping body LY[q]. FIG. 2C exemplifies a case where the first shaping body LY[1] is formed on a shaping platform 45 (refer to FIG. 3) on the basis of designation data SD[1] generated from the section model data Ldat[1], and FIG. 2D exemplifies a case where the second shaping body LY[2] is formed on the first shaping body LY[1] on the basis of designation data SD[2] generated from the section model data Ldat[2].

The solid object shaping apparatus 1 sequentially laminates the shaping bodies LY[1] to LY[Q] corresponding to the designation data SD[1] to SD[Q], so as to shape the solid object Obj illustrated in FIG. 2E.

As described above, the model data Dat according to the present embodiment designates a shape (a shape of a contour) of the outer surface SF of the model of the solid object Obj. For this reason, in a case where the solid object Obj having the shape indicated by the model data Dat is faithfully shaped, a shape of the solid object Obj is a hollow shape of only a contour without thickness. However, in a case where the solid object Obj is shaped, a more inner shape than the outer surface SF is preferably determined in consideration of the intensity or the like of the solid object Obj. Specifically, in a case where the solid object Obj is shaped, a part of a more inner region than the outer surface SF of the solid object Obj or the entire region preferably has a solid structure.

For this reason, as illustrated in FIGS. 2A to 2E, the designation data generation portion 93 according to the present embodiment generates the section model data Ldat which causes a part of a more inner region than the outer surface SF or the entire region to have a solid structure regardless of a shape designated by the model data Dat is a hollow shape.

Hereinafter, in the data generation process, a process of complementing a hollow portion of a shape of a model indicated by the model data Dat and generating the section model data Ldat which causes a shape of a part of or the entire hollow portion to have a solid structure, is referred to as a shape complementing process. The shape complementing process, and a more inner structure than the outer surface SF designated by the section model data Ldat will be described later in detail.

Meanwhile, in the example illustrated in FIGS. 2A to 2E, the shaping body LY[q] formed in the q-th laminate process is present under the shaping body LY[q+1] formed in the (q+1)-th laminate process.

In other words, in the example illustrated in FIGS. 2A to 2E, the solid object Obj does not have a so-called overhang-shaped portion (hereinafter, referred to as an "overhang portion") which projects with a tilt angle greater than 90°. Therefore, in the case illustrated in FIGS. 2A to 2E, it is possible to shape the solid object Obj having a shape corresponding to a shape designated by the model by sequentially laminating the shaping bodies LY[1] to LY[Q].

However, in a case where the solid object Obj has an overhang portion, even if the solid object Obj is to be shaped by sequentially laminating the shaping bodies LY[1] to LY[Q], the overhang portion bends downward by its own weight, and thus there is a high possibility that the solid object Obj may be not shaped in a desired shape.

Therefore, in the present embodiment, in a case where the solid object Obj has the overhang portion, a support for supporting the overhang portion is provided under at least a part of the overhang portion.

Therefore, in the present embodiment, the section model data Ldat includes data defining a shape of the support which is necessary during shaping of the solid object Obj in addition to the data regarding the solid object Obj. In other words, in the present embodiment, the shaping body LY[q] includes a portion of the solid object Obj which is to be formed in a q-th laminate process and a portion of the support which is to be formed in the q-th laminate process. In other words, the designation data SD[q] includes data which indicates a shape and a color of the portion of the solid object Obj formed as the shaping body LY[q], as a set of blocks BL, and data which indicates a shape of the portion of the support formed as the shaping body LY[q], as a set of blocks BL.

The designation data generation portion 93 according to the present embodiment determines whether or not the support is required to be provided in order to form the shaping body LY[q] on the basis of the model data Dat. If a result of the determination is affirmative, the designation data generation portion 93 generates the section model data Ldat which causes both the solid object Obj and the support to be provided.

The support is preferably made of a material which is easily removed after the solid object Obj is shaped, for example, water-soluble ink, or ink having a melting point lower than that of ink used to shape the solid object Obj.

1.2 Solid Object Shaping Apparatus

Figure 3:
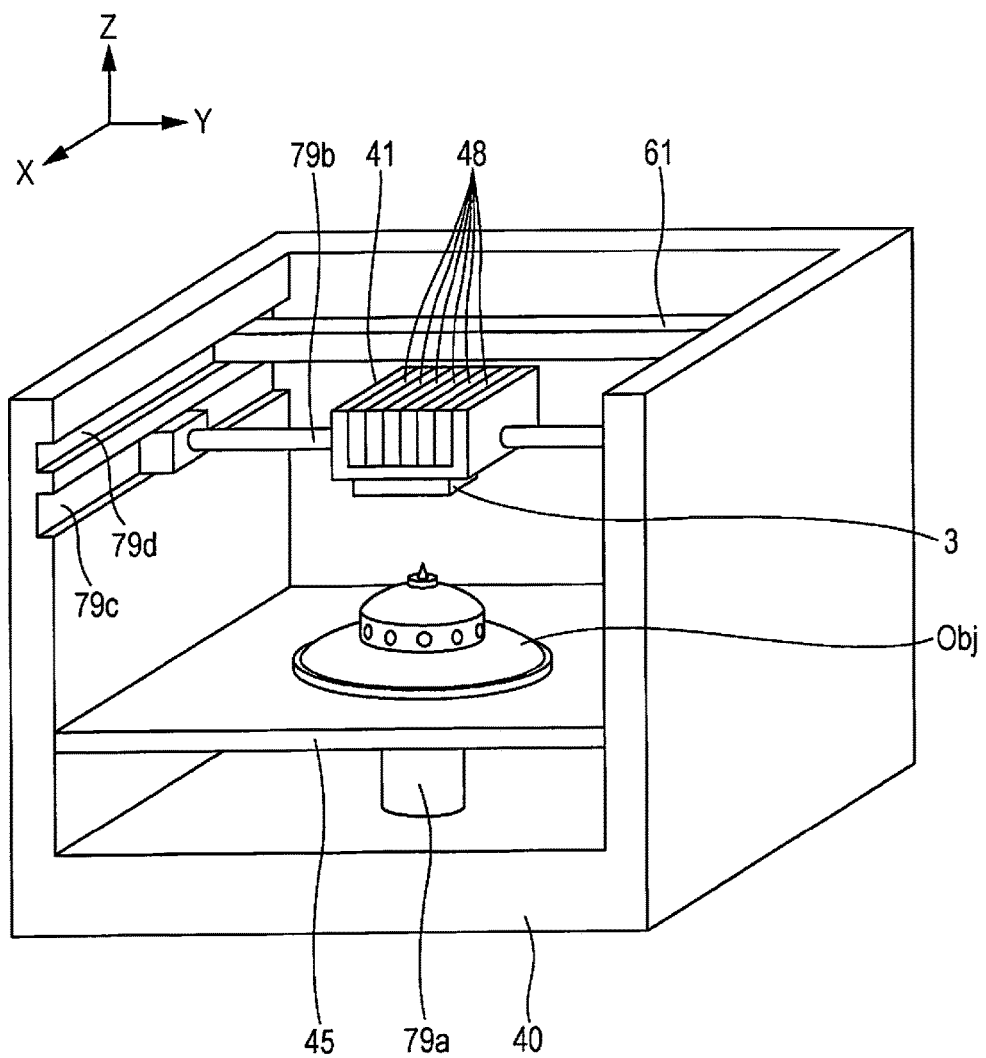
FIG. 3 is a schematic sectional view of a solid object shaping apparatus.

Next, the solid object shaping apparatus 1 will be described with reference to FIGS. 1 and 3. FIG. 3 is a perspective view illustrating a schematic structure of the solid object shaping apparatus 1.

As illustrated in FIGS. 1 and 3, the solid object shaping apparatus 1 includes a casing 40; a shaping platform 45; a control portion 6 which controls an operation of each unit of the solid object shaping apparatus 1; a head unit 3 provided with a recording head 30 including an ejecting portion D which ejects ink toward the shaping platform 45; a curing unit 61 which cures the ink ejected on the shaping platform 45; six ink cartridges 48 which store ink; a carriage 41 in which the head unit 3 and the ink cartridges 48 are mounted; a position changing mechanism 7 which changes positions of the head unit 3, the shaping platform 45, and the curing unit 61 with respect to the casing 40; and a storage portion 60 which stores the control program for the solid object shaping apparatus 1 and other various information.

The control portion 6 and the designation data generation portion 93 function as a system controller 101 which controls an operation of each portion of the solid object shaping system 100.

The curing unit 61 is a constituent element which cures ink ejected on the shaping platform 45. Specifically, the curing unit 61 is a light source which irradiates ultraviolet curable ink with ultraviolet rays (an example of "light with a predetermined wavelength") and is provided, for example, over (+Z direction) of the shaping platform 45. After ink ejected by the solid object shaping apparatus 1 is landed on a voxel Vx, the curing unit 61 irradiates the landed ink with ultraviolet rays so as to cure the ink, thereby forming a dot.

The curing unit 61 in the present embodiment can cure ink in a plurality of curing modes including a normal curing mode (an example of a "first curing mode") and a slow curing mode (an example of a "second curing mode"). The curing unit 61 can operate so as to switch between the curing modes in the voxel Vx unit on the basis of a control signal K supplied from the control portion 6.

Here, the normal curing mode is a curing mode in which a first reference amount of ink ejected onto a voxel Vx from the ejecting portion D is cured to become a dot with substantially the same size as the size of the voxel Vx. The slow curing mode is a curing mode in which the first reference amount of ink ejected onto the voxel Vx from the ejecting portion D is cured to become a dot with the size larger than the size of the voxel Vx in a lower speed than in the normal curing mode. Specifically, the curing unit 61 slows curing of the ink by reducing the intensity (illuminance) of ultraviolet rays applied to the ink in the slow curing mode compared with that in the normal curing mode.

However, the invention is not limited to such an aspect, and the curing unit 61 may slow curing of ink by making irradiation time (curing time) of ultraviolet rays in the slow curing mode shorter than in the normal curing mode.

The six ink cartridges 48 are provided so as to correspond to a total of six types of ink including five color types of shaping ink for shaping the solid object Obj and support ink for forming a support with a one-to-one relationship. Each of the ink cartridges 48 stores the type of ink corresponding to the ink cartridge 48.

The five color types of shaping ink for shaping the solid object Obj include chromatic ink containing a chromatic colorant component, achromatic ink containing an achromatic colorant component, and clear (CL) ink in which the content of a colorant component per unit weight or per unit volume is smaller than that of the chromatic ink and the achromatic ink.

In the present embodiment, three color types of ink including cyan (CY) ink, magenta (MG) ink, and yellow (YL) ink are employed as the chromatic ink.

In the present embodiment, white (WT) ink is employed as the achromatic ink.

The white ink according to the present embodiment is ink which reflects a predetermined proportion or higher of applied light in a case where the light having a wavelength included in a wavelength region (roughly, 400 nm to 700 nm) of visible light is applied to the white ink. In the present embodiment, the "predetermined proportion" may be, for example, any proportion of 30% or higher and 100% or lower, preferably any proportion of 50% or higher, and more preferably any proportion of 80% or higher.

In the present embodiment, the clear ink has the content of a colorant component lower than that of the chromatic ink and the achromatic ink and is thus highly transparent.

Hereinafter, among the five types of shaping ink, the three types of chromatic ink and the single type of achromatic ink are collectively referred to as coloring ink in some cases.

In the present embodiment, each of the ink cartridges 48 is mounted in the carriage 41 but may be provided at other locations of the solid object shaping apparatus 1 instead of being mounted in the carriage 41.

As illustrated in FIGS. 1 and 3, the position changing mechanism 7 includes a lifting mechanism driving motor 71 for driving a shaping platform lifting mechanism 79a which moves up (+Z direction) and down (−Z direction) the shaping platform 45. Hereinafter, the +Z direction (upper side) and the −Z direction (lower side) are collectively referred to as a "Z axis direction" in some cases. In addition, the position changing mechanism 7 includes a carriage driving motor 72 for moving the carriage 41 along a guide 79b in the +Y direction and the −Y direction (hereinafter, the +Y direction and the −Y direction are collectively referred to as a "Y axis direction" in some cases); a carriage driving motor 73 for moving the carriage 41 along a guide 79c in the +X direction and the −X direction (hereinafter, the +X direction and the −X direction are collectively referred to as a "X axis direction" in some cases); and a curing unit driving motor 74 for moving the curing unit 61 along a guide 79d in the +X direction and the −X direction.

The position changing mechanism 7 also includes a motor driver 75 which drives the lifting mechanism driving motor 71; a motor driver 76 which drives the carriage driving motor 72; a motor driver 77 which drives the carriage driving motor 73; and a motor driver 78 which drives the curing unit driving motor 74.

The storage portion 60 includes an electrically erasable programmable read-only memory (EEPROM) which is a kind of nonvolatile memory storing the designation data SD supplied from the host computer 9; a random access memory (RAM) which temporarily stores data required to perform various processes such as the shaping process of shaping the solid object Obj or in which the control program for controlling each portion of the solid object shaping apparatus 1 is temporarily developed in order to perform various processes such as the shaping process; and a PROM which is a kind of nonvolatile memory storing the control program.

The control portion 6 is configured to include a central processing unit (CPU) or a field-programmable gate array (FPGA), and controls an operation of each portion of the solid object shaping apparatus 1 when the CPU or the like operates according to the control program stored in the storage portion 60.

In a case where the designation data SD is supplied from the host computer 9, the control portion 6 controls operations of the head unit 3, the position changing mechanism 7, and the curing unit 61, and thus controls execution of the shaping process of shaping the solid object Obj corresponding to the model data Dat on the shaping platform 45.

Specifically, first, the control portion 6 stores the designation data SD supplied from the host computer 9 in the storage portion 60. Next, the control portion 6 controls an operation of the head unit 3 on the basis of various data such as the designation data SD stored in the storage portion 60, generates and outputs a driving waveform signal Com and a waveform designation signal SI for driving the ejecting portion D, and outputs the generated signals. The control portion 6 generates a control signal K for controlling an operation of the curing unit 61 on the basis of various data such as the designation data SD stored in the storage portion 60, and outputs the signal. The control portion 6 generates various signals for controlling operations of the motor drivers 75 to 78 on the basis of various data such as the designation data SD stored in the storage portion 60, and outputs the generated signals.

The driving waveform signal Com is an analog signal. For this reason, the control portion 6, which includes a DA conversion circuit (not illustrated), converts digital driving waveform signals generated by the CPU and the like included in the control portion 6 into analog driving waveform signals Com and outputs the converted signals.

As mentioned above, the control portion 6 controls a position of the head unit 3 relative to the shaping platform 45 via control of the motor drivers 75, 76 and 77, and controls a position of the curing unit 61 relative to the shaping platform 45 via control of the motor drivers 75 and 78. The control portion 6 controls whether or not ink is ejected from the ejecting portion D, an amount of ink to be ejected, ink ejection timing, and the like via control of the head unit 3. The control portion 6 controls the extent of curing of ink ejected from the ejecting portion D via control of the curing unit 61, and further controls the size of a dot formed by the ink ejected from the ejecting portion D. Consequently, the control portion 6 controls execution of the laminate process in which a plurality of dots are formed while adjusting sizes and arrangement of the dots, and the shaping body LY is formed as a set of the plurality of dots. The control portion 6 controls execution of the shaping process in which new shaping bodies LY are laminated on the shaping body LY which has already been formed by repeatedly performing the laminate process, and thus the solid object Obj corresponding to the model data Dat is formed.

Hereinafter, the head unit 3, the position changing mechanism 7, and the curing unit 61 are referred to as the head unit 3 and the like in some cases.

As illustrated in FIG. 1, the head unit 3 includes the recording head 30 provided with M ejecting portions D, and a driving signal generation portion 31 which generates a driving signal Vin for driving the ejecting portion D (where M is a natural number of 1 or greater). Hereinafter, in order to differentiate the M ejecting portions D provided in the recording head 30 from each other, ejecting portions D are sequentially referred to as a first stage ejecting portion D, a second stage ejecting portion D, . . . , and an M-th stage ejecting portion D in some cases. In addition, hereinafter, an m-th ejecting portion D of the M ejecting portions D provided in the recording head 30 is referred to as an ejecting portion D[m] in some cases (where m is a natural number satisfying 1≤m≤M). Hereinafter, a driving signal Vin for driving the ejecting portion D[m] among the driving signals Vin generated by the driving signal generation portion 31 is referred to as a driving signal Vin[m] in some cases. Details of the driving signal generation portion 31 will be described later.

1.3 Recording Head

Next, with reference to FIGS. 4 to 6, a description will be made of the recording head 30 and the ejecting portion D provided in the recording head 30.

Figure 4:
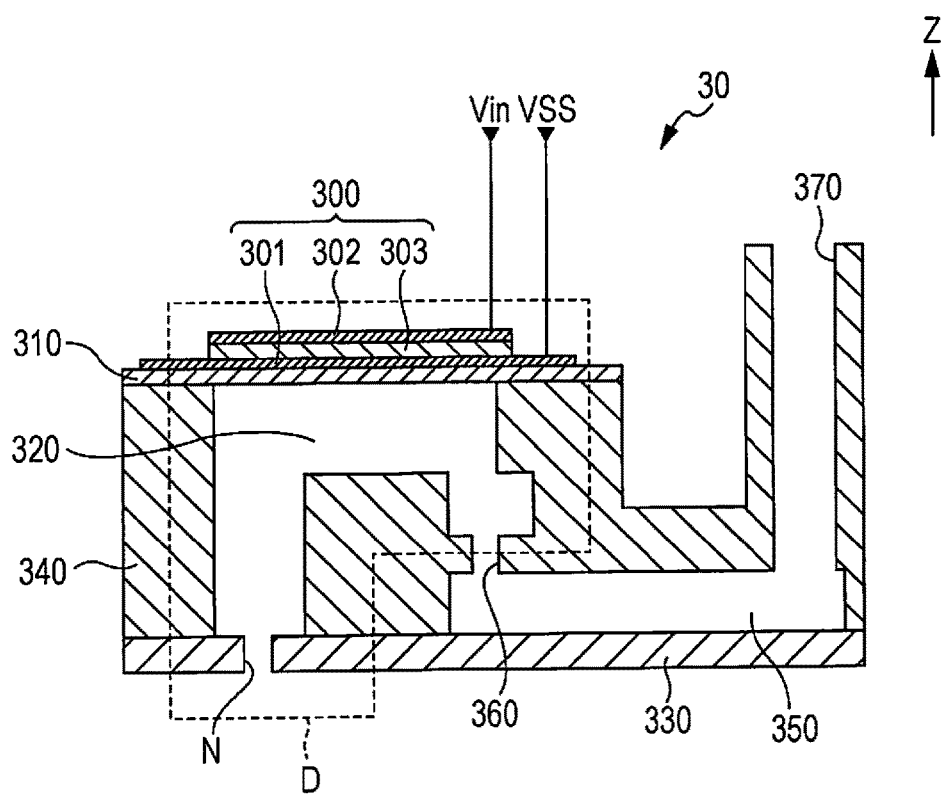
FIG. 4 is a schematic sectional view of a recording head.

FIG. 4 illustrates an example of a schematic partial sectional view of the recording head 30. For convenience of illustration, in the recording head 30, FIG. 4 illustrates one ejecting portion D of the M ejecting portions D included in the recording head 30, a reservoir 350 which communicates with the one ejecting portion D via an ink supply port 360, and an ink intake port 370 for supplying ink from the ink cartridge 48 to the reservoir 350.

As illustrated in FIG. 4, the ejecting portion D includes a piezoelectric element 300, a cavity 320 filled with ink, a nozzle N which communicates with the cavity 320, and a vibration plate 310. In the ejecting portion D, the piezoelectric element 300 is driven by the driving signal Vin, and thus the ink in the cavity 320 is ejected from the nozzle N. The cavity 320 is a space partitioned by a cavity plate 340 which is molded in a predetermined shape having a recess, and a nozzle plate 330 in which the nozzle N is formed, and the vibration plate 310. The cavity 320 communicates with the reservoir 350 via the ink supply port 360. The reservoir 350 communicates with one ink cartridge 48 via the ink intake port 370.

In the present embodiment, as the piezoelectric element 300, for example, a unimorph (monomorph) type piezoelectric element as illustrated in FIG. 4 is used. However, the piezoelectric element 300 is not limited to the unimorph type piezoelectric element, and may be a piezoelectric element which can eject a liquid such as ink through deformation of the piezoelectric element 300, such as a bimorph type or laminate type piezoelectric element.

The piezoelectric element 300 includes a lower electrode 301, an upper electrode 302, and a piezoelectric body 303 provided between the lower electrode 301 and the upper electrode 302. If a potential of the lower electrode 301 is set to a predetermined reference potential VSS, and the driving signal Vin is supplied to the upper electrode 302 so that a voltage is applied between the lower electrode 301 and the upper electrode 302, the piezoelectric element 300 is bent (displaced) in a vertical direction in the figure according to the applied voltage, and thus the piezoelectric element 300 vibrates.

The vibration plate 310 is provided on an upper opening of the cavity plate 340, and the lower electrode 301 is joined to the vibration plate 310. For this reason, if the piezoelectric element 300 vibrates according to the driving signal Vin, the vibration plate 310 also vibrates. A volume of the cavity 320 (pressure in the cavity 320) is changed due to the vibration of the vibration plate 310, and thus the ink filling the cavity 320 is ejected from the nozzle N. If an amount of the ink in the cavity 320 is reduced due to the ejection of the ink, ink is supplied from the reservoir 350. In addition, ink is supplied to the reservoir 350 from the ink cartridge 48 via the ink intake port 370.

Figure 5A:
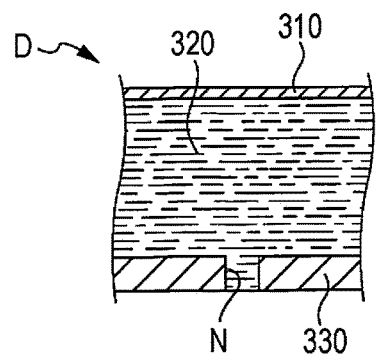
FIGS. 5A to 5C are diagrams for explaining an operation of an ejecting portion when a driving signal is supplied.
Figure 5B:
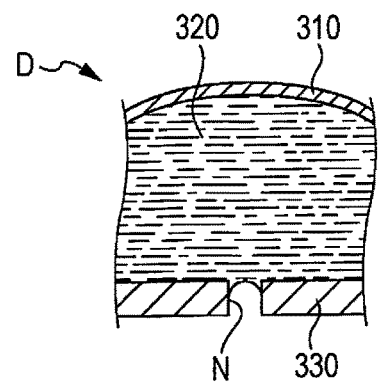
Figure 5C:
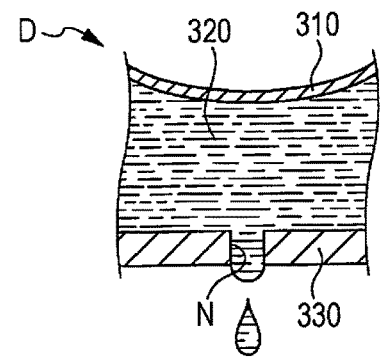

FIGS. 5A to 5C are diagrams for explaining an operation of ejecting ink from the ejecting portion D. In a state illustrated in FIG. 5A, if the driving signal Vin is supplied to the piezoelectric element 300 of the ejecting portion D from the driving signal generation portion 31, distortion corresponding to an electric field applied between the electrodes occurs in the piezoelectric element 300, and thus the vibration plate 310 of the ejecting portion D is bent upward in the figure. Consequently, the volume of the cavity 320 of the ejecting portion D increases as illustrated in FIG. 5B compared with the initial state illustrated in FIG. 5A. In a state illustrated in FIG. 5B, if a potential indicated by the driving signal Vin is changed, the vibration plate 310 is restored by an elastic restoring force thereof so as to be moved downward in the figure exceeding the position of the vibration plate 310 in the initial state, and thus the volume of the cavity 320 rapidly decreases as illustrated in FIG. 5C. At this time, some of the ink filling the cavity 320 is ejected as ink droplets from the nozzle N which communicates with the cavity 320 due to compression pressure occurring in the cavity 320.

Figure 6:
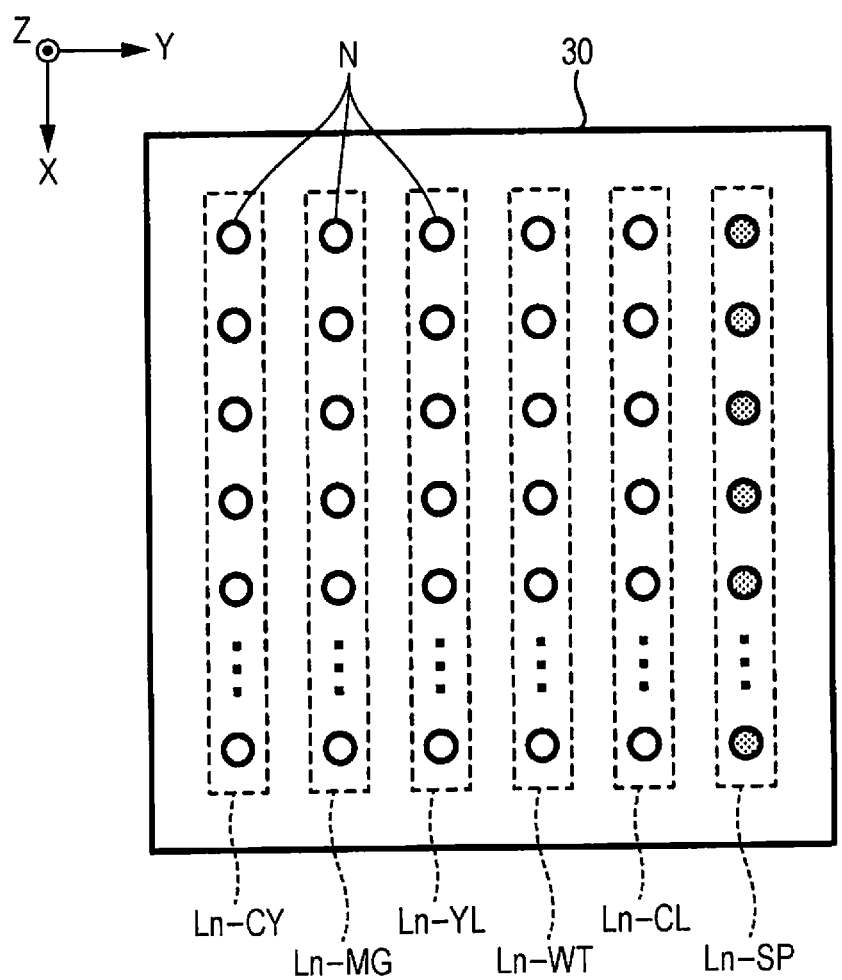
FIG. 6 is a plan view illustrating an arrangement example of nozzles in the recording head.

FIG. 6 is a diagram for explaining an example of arrangement of M nozzles N provided on the recording head 30 in a plan view of the solid object shaping apparatus 1 from the +Z direction or −Z direction.

As illustrated in FIG. 6, the recording head 30 is provided with six nozzle strings Ln including a nozzle string Ln-CY formed of a plurality of nozzles N, a nozzle string Ln-MG formed of a plurality of nozzles N, a nozzle string Ln-YL formed of a plurality of nozzles N, a nozzle string Ln-WT formed of a plurality of nozzles N, a nozzle string Ln-CL formed of a plurality of nozzles N, and a nozzle string Ln-SP formed of a plurality of nozzles N.

Here, the nozzles N included in the nozzle string Ln-CY are nozzles N provided in the ejecting portion D which ejects cyan (CY) ink; the nozzles N included in the nozzle string Ln-MG are nozzles N provided in the ejecting portion D which ejects magenta (MG) ink; the nozzles N included in the nozzle string Ln-YL are nozzles N provided in the ejecting portion D which ejects yellow (YL) ink; the nozzles N included in the nozzle string Ln-WT are nozzles N provided in the ejecting portion D which ejects white (WT) ink; the nozzles N included in the nozzle string Ln-CL are nozzles N provided in the ejecting portion D which ejects clear (CL) ink; and the nozzles N included in the nozzle string Ln-SP are nozzles N provided in the ejecting portion D which ejects support ink.

In the present embodiment, as illustrated in FIG. 6, a case is exemplified in which the plurality of nozzles N included in each nozzle string Ln are disposed to be arranged in a column in the X axis direction. However, for example, some (for example, even-numbered nozzles N) of the plurality of nozzles N included in each nozzle string Ln and the other nozzles N (for example, odd-numbered nozzles N) may be different from each other in positions in the Y axis direction, that is, may be disposed in a so-called zigzag shape. In each nozzle string Ln, an interval (pitch) between the nozzles N may be set as appropriate according to printing resolution (dot per inch: dpi).

1.4 Driving Signal Generation Portion

Next, with reference to FIGS. 7 to 9, a description will be made of a configuration and an operation of the driving signal generation portion 31.

Figure 7:
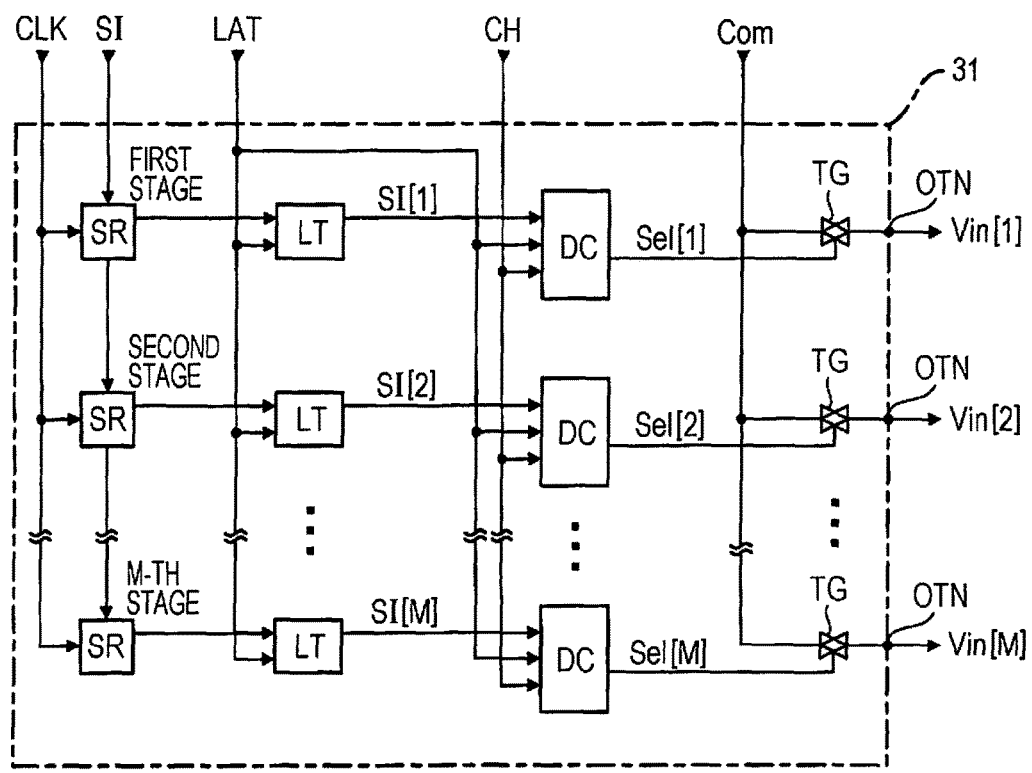
FIG. 7 is a block diagram illustrating a configuration of a driving signal generation portion.

FIG. 7 is a block diagram illustrating a configuration of the driving signal generation portion 31.

As illustrated in FIG. 7, the driving signal generation portion 31 is provided with M sets each of which includes a shift register SR, a latch circuit LT, a decoder DC, and a transmission gate TG, so as to respectively correspond to the M ejecting portions D provided in the recording head 30. Hereinafter, the respective elements constituting the M sets included in the driving signal generation portion 31 and the recording head 30 are sequentially referred to as first stage elements, second stage elements, . . . , and M-th stage elements from the top in the figure.

A clock signal CLK, a waveform designation signal SI, a latch signal LAT, a change signal CH, and a driving waveform signal Com are supplied to the control portion 6 from the driving signal generation portion 31.

The waveform designation signal SI is a digital signal which is defined on the basis of the designation data SD and designates whether or not ink is to be ejected from the ejecting portion D and an amount of ink to be ejected from the ejecting portion D. The waveform designation signal SI includes waveform designation signals SI[1] to SI[M]. Among the signals, the waveform designation signal SI[m] defines whether or not ink is to be ejected from the ejecting portion D[m], and an amount of ink to be ejected, in two bits including a high-order bit b1 and a low-order bit b2. Specifically, the waveform designation signal SI[m] designates any one of three types of operations such as ejection of ink in a first reference amount, ejection of ink in a second reference amount smaller than the first reference amount, and non-ejection of ink, for the ejecting portion D[m].

Here, the first reference amount of ink is an amount of ink which causes a dot with substantially the same size as the size of a voxel Vx to be formed in a case where the ink is cured in the normal curing mode as described above. The second reference amount of ink is an amount of ink which is substantially a half of the first reference amount in the present embodiment.

Hereinafter, a dot with substantially the same size as that of a voxel Vx is referred to as a large dot, and a dot with substantially a half size of the voxel Vx is referred to as a small dot, in some cases.

Each of the shift registers SR temporarily holds a 2-bit waveform designation signal SI[m] corresponding to each stage among the waveform designation signals SI (SI[1] to SI[M]). Specifically, the M shift registers SR including the first, second, . . . and M-th stage shift registers SR which respectively correspond to the M ejecting portions D[1] to D[M] are connected to each other in the vertical direction. In addition, the waveform designation signals SI which are serially supplied are transmitted to the subsequent stages according to the clock signal CLK. In a case where the waveform designation signals SI have been transmitted to all of the M shift registers SR, each of the M shift registers SR holds the 2-bit waveform designation signal SI[m] corresponding thereto among the waveform designation signals SI.

The M latch circuits LT simultaneously latch the 2-bit waveform designation signal SI[m], corresponding to the respective stages, held in the M shift registers SR, at a rising timing of the latch signal LAT.

Meanwhile, an operation period which is a period in which the solid object shaping apparatus 1 performs the shaping process includes a plurality of unit periods Tu. In the present embodiment, each of the unit periods Tu is formed of two control periods Ts (Ts1 and Ts2). In the present embodiment, the two control periods Ts1 and Ts2 have the same duration. As will be described later in detail, the unit period Tu is defined by the latch signal LAT, and the control period Ts is defined by the latch signal LAT and the change signal CH.

The control portion 6 supplies the waveform designation signal SI to the driving signal generation portion 31 at a timing before the unit period Tu starts. The control portion 6 supplies the latch signal LAT to each latch circuit LT of the driving signal generation portion 31 so that the waveform designation signal SI[m] is latched for each unit period Tu.

The m-th stage decoder DC decodes the 2-bit waveform designation signal SI[m] latched by the m-th latch circuit LT, and outputs a selection signal Sel[m] which is set to either a high level ("H" level) or a low level ("L" level) in each of the control periods Ts1 and Ts2.

Figures 8, 9:
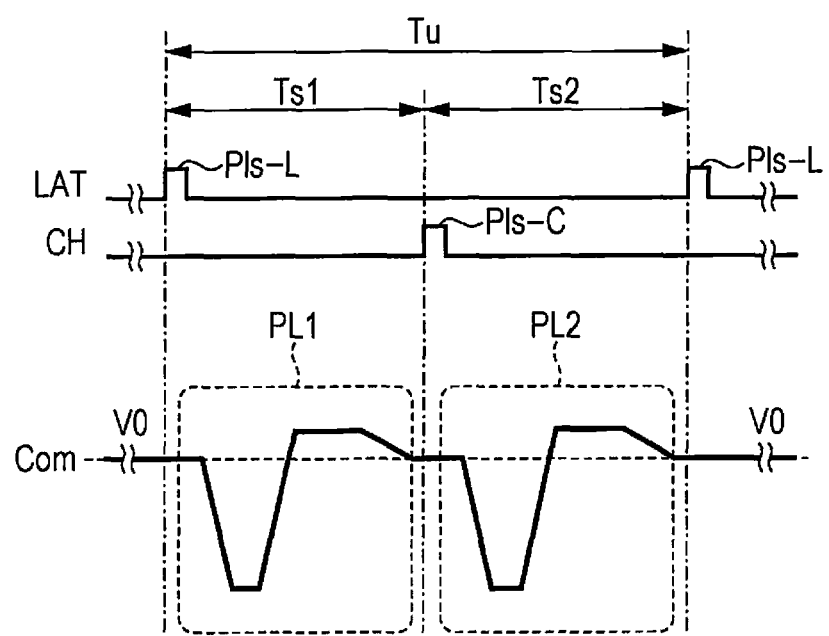
FIG. 8 is a diagram illustrating the content of a selection signal.
FIG. 9 is a timing chart illustrating a waveform of a driving waveform signal.

FIG. 8 is a diagram for explaining the content decoded by the decoder DC. As illustrated in FIG. 8, the m-th stage decoder DC sets the selection signal Sel[m] to an "H" level in the control periods Ts1 and Ts2 if the content indicated by the waveform designation signal SI[m] is (b1, b2)=(1, 1). The m-th stage decoder DC sets the selection signal Sel[m] to an "H" level in the control period Ts1 and sets the selection signal Sel[m] to an "L" level in the control period Ts2 if the content indicated by the waveform designation signal SI[m] is (b1, b2)=(1, 0). The m-th stage decoder DC sets the selection signal Sel[m] to an "L" level in the control periods Ts1 and Ts2 if the content indicated by the waveform designation signal SI[m] is (b1, b2)=(0, 0).

As illustrated in FIG. 7, the M transmission gates TG are provided so as to respectively correspond to the M ejecting portions D. The m-th stage transmission gate TG is turned on when the selection signal Sel[m] output from the m-th stage decoder DC is in an "H" level, and is turned off when the selection signal Sel[m] is in an "L" level. The driving waveform signal Com is supplied to one end of each transmission gate TG.

The other end of the m-th stage transmission gate TG is electrically connected to an m-th stage output end OTN.

If the selection signal Sel[m] is brought into an "H" level, and thus the m-th stage transmission gate TG is turned on, the driving waveform signal Com is supplied from the m-th stage output end OTN to the ejecting portion D[m] as the driving signal Vin[m].

As will be described later in detail, in the present embodiment, a potential of the driving waveform signal Com is set to a reference potential V0 at timings (that is, start and end timings of the control periods Ts) at which the transmission gate TG is switched from an ON state to an OFF state. For this reason, in a case where the transmission gate TG is turned off, a potential of the output end OTN is maintained in the reference potential V0 due to the capacity of the piezoelectric element 300 of the ejecting portion D[m]. Hereinafter, for convenience of description, the description will be made assuming that, if the transmission gate TG is turned off, a potential of the driving signal Vin[m] is maintained as the reference potential V0.

As described above, the control portion 6 controls the driving signal generation portion 31 so that the driving signal Vin is supplied to each ejecting portion D for each unit period Tu. Consequently, each ejecting portion D can eject ink in an amount corresponding to a value indicated by the waveform designation signal SI which is defined on the basis of the waveform designation signal SI, and can thus form dots on the shaping platform 45.

FIG. 9 is a timing chart for explaining various signals which are supplied from the control portion 6 to the driving signal generation portion 31 in each unit period Tu.

As exemplified in FIG. 9, the latch signal LAT includes a pulse waveform Pls-L, and the unit period Tu is defined by the pulse waveform Pls-L. The change signal CH includes a pulse waveform Pls-C, and the unit period Tu is divided into the control periods Ts1 and Ts2 by the pulse waveform Pls-C. Although not illustrated, the control portion 6 serially supplies the waveform designation signal SI to the driving signal generation portion 31 in synchronization with the clock signal CLK for each unit period Tu.

As exemplified in FIG. 9, the driving waveform signal Com includes a waveform PL1 disposed in the control period Ts1, and a waveform PL2 disposed in the control period Ts2. Hereinafter, the waveforms PL1 and PL2 are collectively referred to as a waveform PL in some cases. In the present embodiment, a potential of the driving waveform signal Com is set to the reference potential V0 at the start or end timing of each control period Ts.

In a case where the selection signal Sel[m] is in an "H" level in a certain control period Ts, the driving signal generation portion 31 supplies the waveform PL of the driving waveform signal Com disposed in the control period Ts to the ejecting portion D[m] as the driving signal Vin[m]. Conversely, in a case where the selection signal Sel[m] is in an "L" level in a certain control period Ts, the driving signal generation portion 31 supplies the waveform PL of the driving waveform signal Com set to the reference potential V0 to the ejecting portion D[m] as the driving signal Vin[m].

Therefore, the driving signal Vin[m] supplied to the ejecting portion D[m] in the unit period Tu by the driving signal generation portion 31 becomes a signal having the waveforms PL1 and PL2 if a value indicated by the waveform designation signal SI[m] is (b1, b2)=(1, 1). The driving signal Vin[m] becomes a signal having the waveform PL1 if a value indicated by the waveform designation signal SI[m] is (b1, b2)=(1, 0). The driving signal Vin[m] becomes a signal set to the reference potential V0 if a value indicated by the waveform designation signal SI[m] is (b1, b2)=(0, 0).

If the driving signal Vin[m] having a single waveform PL is supplied, the ejecting portion D[m] ejects the second reference amount of ink.

For this reason, in a case where a value indicated by the waveform designation signal SI[m] is (b1, b2)=(1, 0) and the driving signal Vin[m] supplied to the ejecting portion D[m] has a single waveform PL (PL1) in the unit period Tu, the second reference amount of ink is ejected from the ejecting portion D[m] on the basis of the single waveform PL. Therefore, in a case where the ejected ink is cured in the normal curing mode, a small dot is formed.

In a case where a value indicated by the waveform designation signal SI[m] is (b1, b2)=(1, 1) and the driving signal Vin[m] supplied to the ejecting portion D[m] has two waveforms PL (PL1 and PL2) in the unit period Tu, the second reference amount of ink is ejected from the ejecting portion D[m] twice on the basis of the two waveforms PL, and the first reference amount of ink is formed through combination of the second reference amount of ink ejected twice. Therefore, in a case where the combined ink is cured in the normal curing mode, a large dot is formed.

On the other hand, in a case where a value indicated by the waveform designation signal SI[m] is (b1, b2)=(0, 0) and the driving signal Vin[m] supplied to the ejecting portion D[m] is maintained in the reference potential V0 without the waveform PL in the unit period Tu, ink is not ejected from the ejecting portion D[m], and thus no dot is formed (recording is not performed).

2. Data Generation Process and Shaping Process

Next, with reference to FIGS. 10 to 16B, a description will be made of the data generation process and the shaping process performed by the solid object shaping system 100.

2.1 Summary of Data Generation Process and Shaping Process

Figure 10:
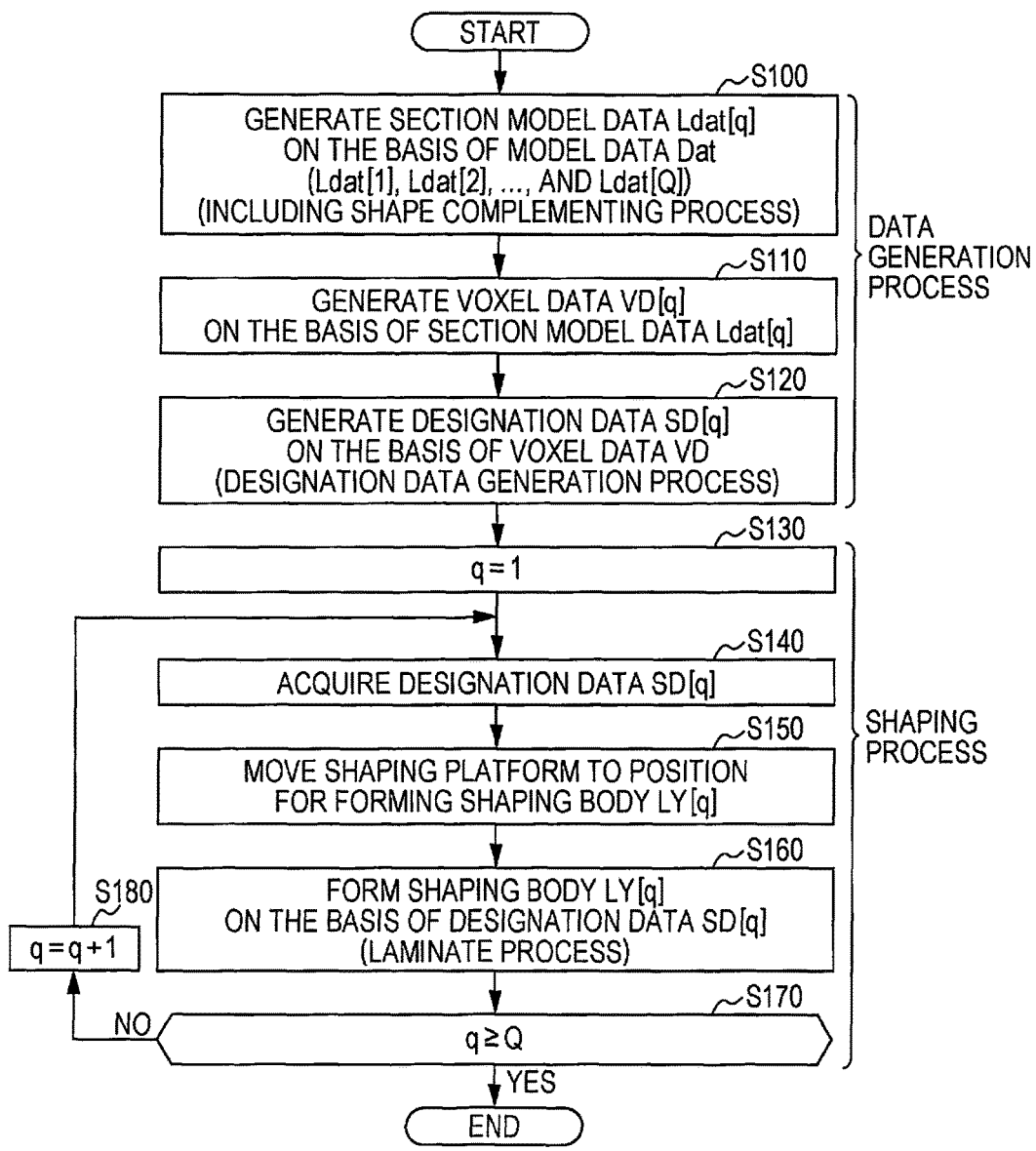
FIG. 10 is a flowchart illustrating a data generation process and a shaping process.

FIG. 10 is a flowchart illustrating an example of an operation of the solid object shaping system 100 in a case where the data generation process and the shaping process are performed.

The data generation process is a process performed by the designation data generation portion 93 of the host computer 9, and is started when the designation data generation portion 93 acquires the model data Dat output from the model data generation portion 92. Processes in steps S100, S110 and S120 illustrated in FIG. 10 correspond to the data generation process.

As illustrated in FIG. 10, if the data generation process is started, the designation data generation portion 93 generates the section model data Ldat[q] (Ldat[1] to Ldat[Q]) on the basis of the model data Dat output from the model data generation portion 92 (step S100). As described above, in step S100, the designation data generation portion 93 performs the shape complementing process of complementing a hollow portion of a shape indicated by the model data Dat is complemented, and generating the section model data Ldat which causes a part of a more inner region than an outer surface SF of a model of the solid object Obj indicated by the model data Dat or the entire region to have a solid shape. Details of the shape complementing process will be described later.

Next, the designation data generation portion 93 generates the voxel data VD[q] which is data approximating and representing a shape and a color of a sectional body of a model indicated by the section model data Ldat[q] as a set of voxels Vx (step S110).

When the model indicated by the model data Dat is approximated with a voxel assembly in step S110, the designation data generation portion 93 of the present embodiment calculates a filling proportion RF which is a proportion of a volume occupied by a more inner portion than the outer surface SF of the model indicated by the model data Dat to the entire voxel Vx in the voxel Vx, and defines each voxel Vx so that the filling proportion RF thereof satisfies "RF≥α1". Here, the threshold value α1 is a real number satisfying "0%<α1<100%", preferably satisfying "0%<α1≤50%", and more preferably satisfying "20%≤α1≤40%".

A voxel Vx whose filling proportion RF is "RF<100%" is a voxel Vx including both of the inside and outside of the outer surface SF of the model. For example, a voxel Vx whose filling proportion RF is "RF≤20%" is a voxel Vx in which 80% of a space of the voxel Vx protrudes toward the outside of the outer surface SF of the model. In the present embodiment, the voxel data VD indicating a voxel assembly is generated so that the filling proportion RF of each voxel Vx is the threshold value α1 or greater (for example, 20% or higher). For this reason, it is possible to prevent a voxel Vx which greatly protrudes toward the outside of the outer surface SF of the model from being formed, and thus the voxel assembly indicated by the voxel data VD can be provided to have a shape similar to the model indicated by the model data Dat.

Next, the designation data generation portion 93 performs a designation data generation process of determining the size of each of a plurality of blocks BL (that is, sizes or arrangement of respective dots to be formed by the solid object shaping apparatus 1) to be formed by the solid object shaping apparatus 1 in order to form the shaping body LY[q] on the basis of the voxel data VD and the model data Dat, and generating the designation data SD[q] on the basis of a determination result (step S120). Details of the designation data generation process will be described later.

As mentioned above, the designation data generation portion 93 performs the data generation process indicated by steps S100 to S120 of FIG. 10.

The solid object shaping system 100 performs the data generation process and then performs the shaping process.

The shaping process is a process performed by the solid object shaping apparatus 1 under the control of the control portion 6, and is started when the designation data SD output from the host computer 9 is acquired by the solid object shaping apparatus 1 and is stored in the storage portion 60. Processes in steps S130 to S180 illustrated in FIG. 10 correspond to the shaping process.

As illustrated in FIG. 10, the control portion 6 sets a variable q indicating the number of laminate processes to be performed to "1" (step S130). Next, the control portion 6 acquires the designation data SD[q] generated by the designation data generation portion 93 from the storage portion 60 (step S140). The control portion 6 controls the lifting mechanism driving motor 71 so that the shaping platform 45 is moved to a position for forming the shaping body LY[q] (step S150).

The position of the shaping platform 45 for forming the shaping body LY[q] may be any position as long as ink ejected from the head unit 3 can be landed at the position with respect to a dot formation location (voxel Vxq) indicated by the designation data SD[q]. For example, in step S150, the control portion 6 may control a position of the shaping platform 45 so that a gap between the shaping body LY[q] and the head unit 3 in the Z axis direction is made constant. In this case, the control portion 6 may form the shaping body LY[q] in the q-th laminate process, and then may move the shaping platform 45 by the predetermined thickness ΔZ in the −Z direction until a shaping body LY[q+1] starts to be formed through a (q+1)-th laminate process.

Next, the control portion 6 controls operations of the head unit 3 and the like so that the shaping body LY[q] corresponding to the designation data SD[q] is formed (step S160). As is clear from FIGS. 2A to 2E, the shaping body LY[1] is formed on the shaping platform 45, and the shaping body LY [q+1] is formed on the shaping body LY[q].

Thereafter, the control portion 6 determines whether or not q satisfies "q≥Q" (step S170), and determines that shaping of the solid object Obj is completed and finishes the shaping process if a determination result is affirmative. On the other hand, if a determination result is negative, 1 is added to the variable q, and the process proceeds to step S140 (step S180).

As mentioned above, the designation data generation portion 93 of the solid object shaping system 100 performs the data generation process indicated by steps S100 to S120 of FIG. 10, and thus the designation data SD[1] to SD[Q] is generated on the basis of the model data Dat. The solid object shaping apparatus 1 of the solid object shaping system 100 performs the shaping process indicated by steps S130 to S180 of FIG. 10 under the control of the control portion 6, and thus such a solid object Obj which reproduces a shape and a color of a model indicated by the model data Dat is shaped.

FIG. 10 illustrates only an example of a flow of the data generation process and the shaping process. For example, in FIG. 10, the data generation process is completed and then the shaping process is started, but the invention is not limited to such an aspect, and the shaping process may be started before the data generation process is completed. For example, in a case where the designation data SD[q] is generated in the data generation process, a shaping process (that is, the q-th laminate process) of forming the shaping body LY[q] may be performed after the designation data SD[q] is acquired without waiting for the next designation data SD[q+1] to be generated.

2.2 Shape Complementing Process

As described above, in step S100, the designation data generation portion 93 performs the shape complementing process of complementing a part of or the hollow portion of a shape of the outer surface SF of the model of the solid object Obj designated by the model data Dat and generating the section model data Ldat which causes a part of a more inner region than the outer surface SF of the model of the solid object Obj or the entire region to have a solid structure.

Hereinafter, with reference to FIGS. 11A to 12, a description will be made of a more inner structure than the outer surface SF of the model of the solid object Obj indicated by the section model data Ldat and the shape complementing process of defining the more inner structure than the outer surface SF.

First, with reference to FIGS. 11A and 11B, a description will be made of a more inner structure than the outer surface SF of the model of the solid object Obj indicated by the section model data Ldat. Here, FIG. 11A is a perspective view of the model of the solid object Obj indicated by the section model data Ldat, and FIG. 11B is a sectional view obtained when cutting the model of the solid object Obj illustrated in FIG. 11A on a plane parallel to the Z axis along a straight line XIB-XIB. In FIGS. 11A and 11B, for convenience of illustration, a case is assumed in which a spherical solid object Obj having a shape which is different from that in FIGS. 2A to 3.

As illustrated in FIG. 11B, the solid object Obj shaped on the basis of the section model data Ldat includes three layers such as a colored layer L1, a shield layer L2, and an inner layer L3, and a hollow portion HL which is located further inward than the three layers, in this order toward the inside of the solid object Obj from a surface of the solid object Obj.

Here, the colored layer L1 is a layer which is formed by ink containing shaping ink, and is a layer including the surface of the solid object Obj for representing a color of the solid object Obj. The shield layer L2 is a layer which is formed by using, for example, white ink, and is a layer for preventing a color of a more inner portion of the colored layer L1 in the solid object Obj from being transmitted through the colored layer L1 and being thus visually recognized from the outside of the solid object Obj. In other words, the colored layer L1 and the shield layer L2 are provided so that a color to be displayed by the solid object Obj is accurately represented. Hereinafter, in the solid object Obj, the colored layer L1 and the shield layer L2, which are provided so that a color to be displayed by the solid object Obj is accurately represented, are referred to as an outer region LOUT of the solid object Obj in some cases. The inner layer L3 is a layer which is provided to ensure the intensity of the solid object Obj, and is formed by using clear ink as a principle. Hereinafter, in the solid object Obj, the inner layer L3 and the hollow portion HL provided further inward than the outer region LOUT are referred to as an inner region LIN (or the "inside of the solid object Obj") of the solid object Obj in some cases.

In the present embodiment, for simplification, as illustrated in FIG. 11B, a case is assumed that the colored layer L1 has a substantially uniform thickness $\Delta L1$, the shield layer L2 has a substantially uniform thickness $\Delta L2$, and the inner layer L3 has a substantially uniform thickness $\Delta L3$, but a thickness of each layer may not be substantially uniform.

Figure 12:
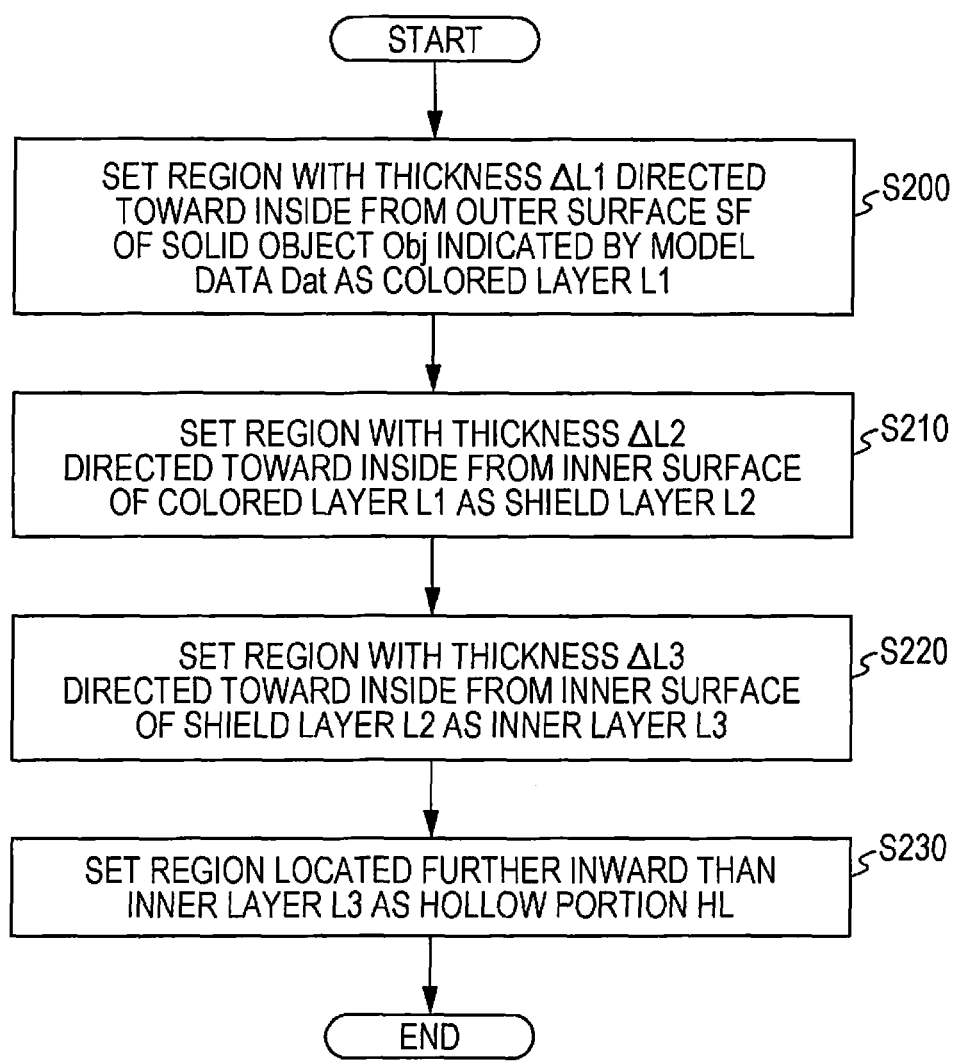
FIG. 12 is a flowchart illustrating a shape complementing process.

FIG. 12 is a flowchart illustrating an example of an operation of the designation data generation portion 93 in a case of performing the shape complementing process.

As illustrated in FIG. 12, first, the designation data generation portion 93 sets a region with the thickness $\Delta L1$ which is directed from the outer surface SF of the model of the solid object Obj toward the inside of the model of the solid object Obj as the colored layer L1 in the model of the solid object Obj indicated by the model data Dat (step S200). The designation data generation portion 93 sets a region with the thickness $\Delta L2$ which is directed from an inner surface of the colored layer L1 toward the inside of the model of the solid object Obj as the shield layer L2 (step S210). The designation data generation portion 93 sets a region with the thickness $\Delta L3$ which is directed from an inner surface of the shield layer L2 toward the inside of the model of the solid object Obj as the inner layer L3 (step S220). The designation data generation portion 93 sets a portion of the model of the solid object Obj located further inward than the inner layer L3 as the hollow portion HL (step S230).

The designation data generation portion 93 performs the above-described shape complementing process so as to generate the section model data Ldat for shaping the solid object Obj having the colored layer L1, the shield layer L2, and the inner layer L3 as exemplified in FIG. 11B.

2.3 Designation Data Generation Process

In step S120, the designation data generation portion 93 performs the designation data generation process of determining the type of block BL to be formed in each voxel Vx on the basis of the voxel data VD and the model data Dat and generating the designation data SD on the basis of the determination result and the voxel data VD. Hereinafter, the designation data generation process will be described with reference to FIGS. 13 to 16B.

Figure 13:
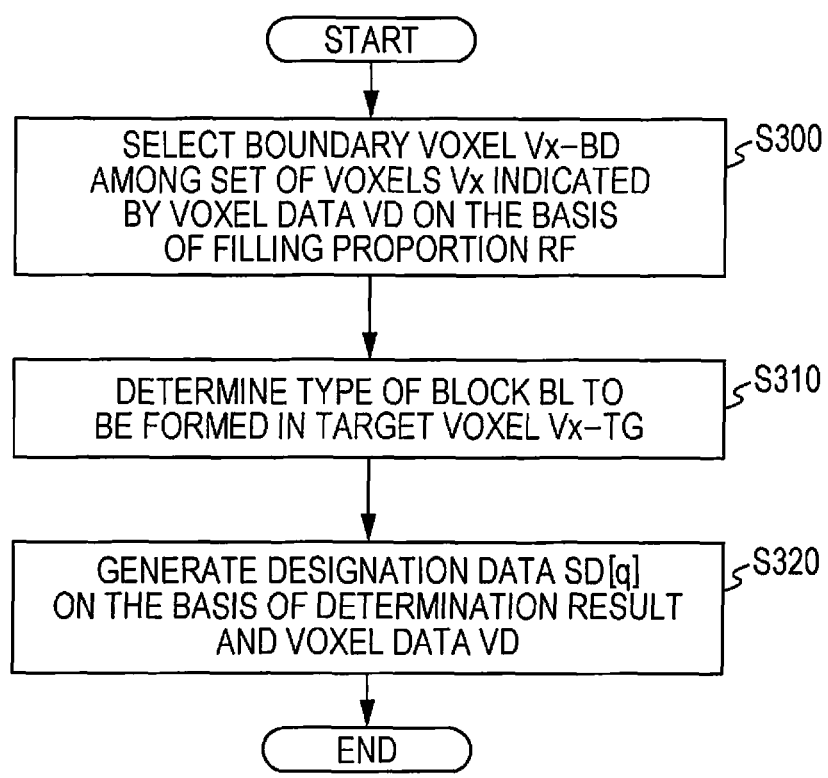
FIG. 13 is a flowchart illustrating a designation data generation process.

FIG. 13 is a flowchart illustrating an example of an operation of the designation data generation portion 93 in a case of performing the designation data generation process. Hereinafter, a description will be made of summary of the designation data generation process with reference to FIG. 13.

As illustrated in FIG. 13, first, designation data generation portion 93 selects a boundary voxel Vx-BD among a plurality of voxels Vx constituting a voxel assembly indicated by the voxel data VD on the basis of a filling proportion RF of each voxel Vx (step S300).

The boundary voxel Vx-BD is a voxel Vx whose filling proportion RF satisfies "$\alpha 1 \leq RF \leq \alpha 2$" and in which, among six faces constituting a surface of the voxel Vx, an upper face (a face whose normal line is directed in the +Z direction) or a lower face (a face whose normal line is directed in the −Z direction) corresponds to a surface of the voxel assembly indicated by the voxel data VD. Here, the threshold value $\alpha 2$ is a real number satisfying "$\alpha 1 < \alpha 2 < 100\%$", and preferably satisfying "$\alpha 1 < \alpha 2 \leq 80\%$". For example, $\alpha 1$ may be set to 33%, and $\alpha 2$ may be set to 66%.

The designation data generation portion 93 sorts the boundary voxel Vx-BD selected in step S300 into either a lower face boundary voxel Vx-BDd or an upper face boundary voxel Vx-BDu.

Here, the lower face boundary voxel Vx-BDd is a voxel Vx which is selected as a boundary voxel Vx-BD and in which a lower face of the voxel Vx corresponds to a surface of the voxel assembly (refer to FIG. 14A). The upper face boundary voxel Vx-BDu is a voxel Vx which is selected as a boundary voxel Vx-BD and in which an upper face of the voxel Vx corresponds to the surface of the voxel assembly (refer to FIG. 14B).

Next, the designation data generation portion 93 specifies a target voxel Vx-TG on the basis of the boundary voxel Vx-BD (the upper face boundary voxel Vx-BDu or the lower face boundary voxel Vx-BDd) selected in step S300, and determines the type of block BL to be formed in the target voxel Vx-TG (step S310).

FIGS. 14A and 14B are diagrams for explaining the target voxel Vx-TG specified by the designation data generation portion 93 and the type of block BL determined by the designation data generation portion 93 in step S310. FIGS. 14A and 14B illustrate a part of a section in a case where the solid object Obj is cut on a plane parallel to the Z axis direction.

In step S310, as illustrated in FIG. 14A, the designation data generation portion 93 specifies a voxel Vx (hereinafter, referred to as an "adjacent voxel Vx-NB") which is adjacent to an upper side of the lower face boundary voxel Vx-BDd as the target voxel Vx-TG. As illustrated in FIG. 14B, the designation data generation portion 93 specifies the upper face boundary voxel Vx-BDu as the target voxel Vx-TG.

In step S310, the designation data generation portion 93 specifies the target voxel Vx-TG and then determines the type of block BL to be formed in the target voxel Vx-TG. Specifically, as illustrated in FIG. 14A, if the target voxel Vx-TG is the adjacent voxel Vx-NB, the designation data generation portion 93 determines that a single large block BLL is to be formed in the target voxel Vx-TG and the lower face boundary voxel Vx-BDd. As illustrated in FIG. 14B, if the target voxel Vx-TG is the upper face boundary voxel Vx-BDu, the designation data generation portion 93 determines that a small block BLS is to be formed in the target voxel Vx-TG. The designation data generation portion 93 determines that a normal block BLM is to be formed in voxels Vx other than the target voxel Vx-TG and the boundary voxel Vx-BD.

Figure 15A:
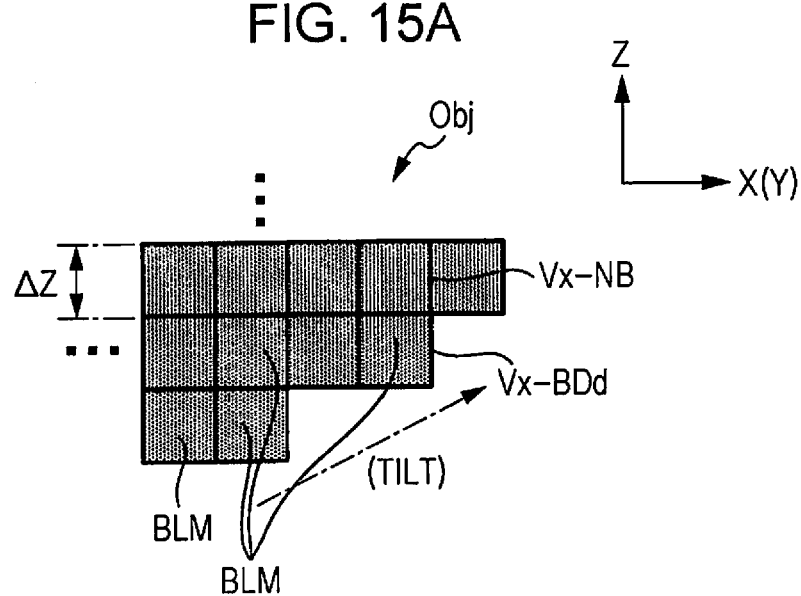
FIGS. 15A and 15B are diagrams for explaining a solid object related to a comparative example.
Figure 15B:
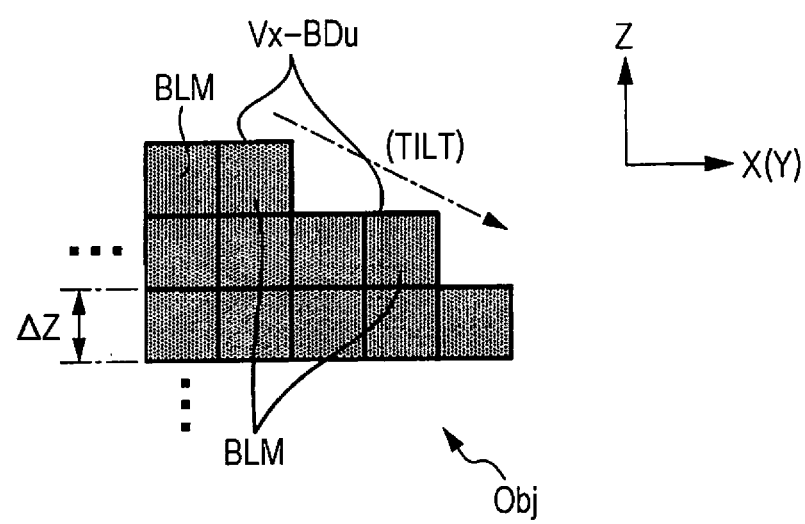

FIGS. 15A and 15B are diagrams illustrating sections of a solid object Obj shaped by a solid object shaping apparatus related to a comparative example. The solid object shaping apparatus related to the comparative example is different from the solid object shaping apparatus of the present embodiment in that a normal block BLM is formed in a target voxel Vx-TG instead of forming a small block BLS or a large block BLL therein. In other words, the solid object shaping apparatus related to the comparative example shapes a solid object Obj having a shape which is substantially the same as a shape indicated by the voxel data VD.

As illustrated in FIGS. 15A and 15B, the solid object shaping apparatus related to the comparative example forms the normal block BLM in all voxels Vx, and thus irregularities of a surface of a shaped solid object Obj become notable compared with the present embodiment illustrated in FIGS. 14A and 14B.

For example, in the comparative example, as illustrated in FIG. 15A, in a case where a tilt directed from the −Z direction toward the +X direction is provided on a surface of the solid object Obj, a step difference corresponding to a predetermined thickness ΔZ is formed on the surface of the solid object Obj. Similarly, in the comparative example, as illustrated in FIG. 15B, also in a case where a tilt directed from the +Z direction toward the +X direction is provided on the surface of the solid object Obj, a step difference corresponding to the predetermined thickness ΔZ is formed on the surface of the solid object Obj.

In contrast, in the present embodiment, as illustrated in FIGS. 14A and 14B, in a case where a tilt is provided on the surface of the solid object Obj, a step difference occurring on the surface of the solid object Obj can be reduced to a half of the predetermined thickness ΔZ. For this reason, the solid object shaping apparatus 1 according to the present embodiment can shape the solid object Obj having a smooth surface with less roughness by reducing the possibility that irregularities may be visually recognized on the surface of the solid object Obj, compared with the solid object shaping apparatus related to the comparative example.

After the process in step S310 is completed, the designation data generation portion 93 generates the designation data SD on the basis of the determination result in step S310 and the voxel data VD (step S320). Specifically, in step S320, the designation data generation portion 93 generates the designation data SD designating a dot with the size which causes the type of block BL determined in step S310 is formed in the target voxel Vx-TG.

Figure 16A:
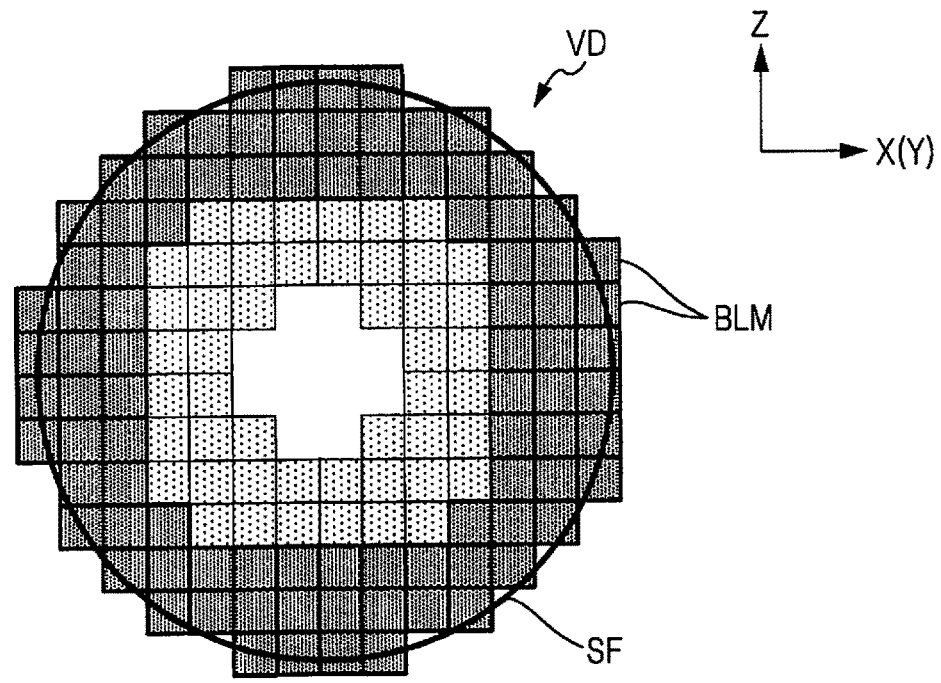
FIGS. 16A and 16B are diagrams for explaining a relationship between voxel data and designation data.
Figure 16B:
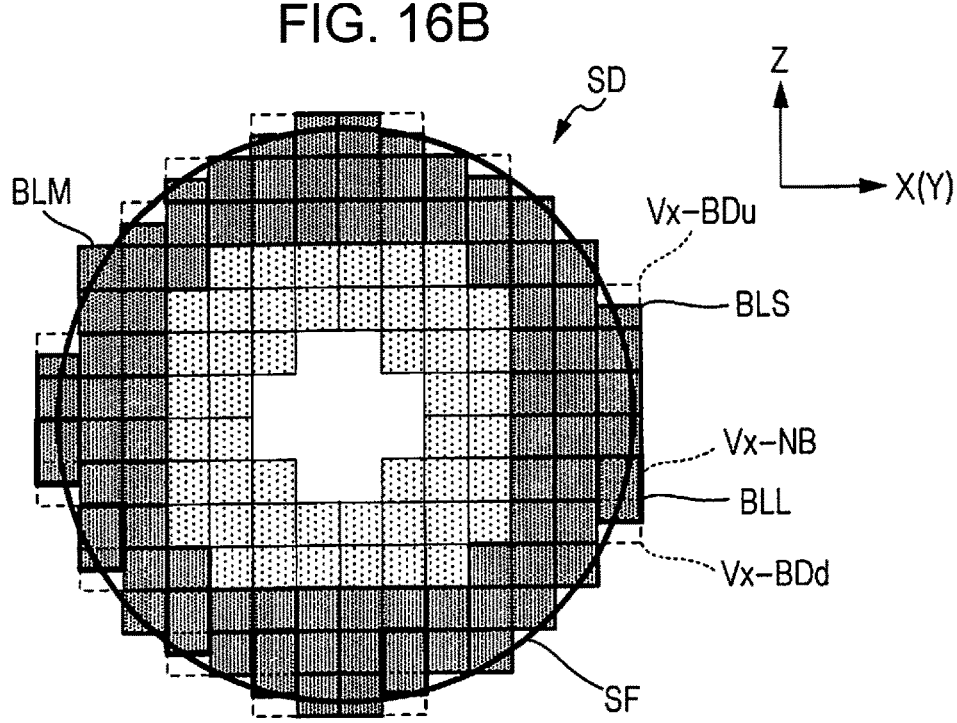

FIGS. 16A and 16B are diagrams for explaining the designation data SD through comparison with the voxel data VD. Of the figures, FIG. 16A illustrates an example of a solid object Obj which is shaped by a solid object shaping apparatus related to a comparative example and is indicated by the voxel data VD. FIG. 16B illustrates an example of a solid object Obj which is shaped by the solid object shaping apparatus 1 according to the present embodiment and is indicated by the designation data SD.

Figure 11A:
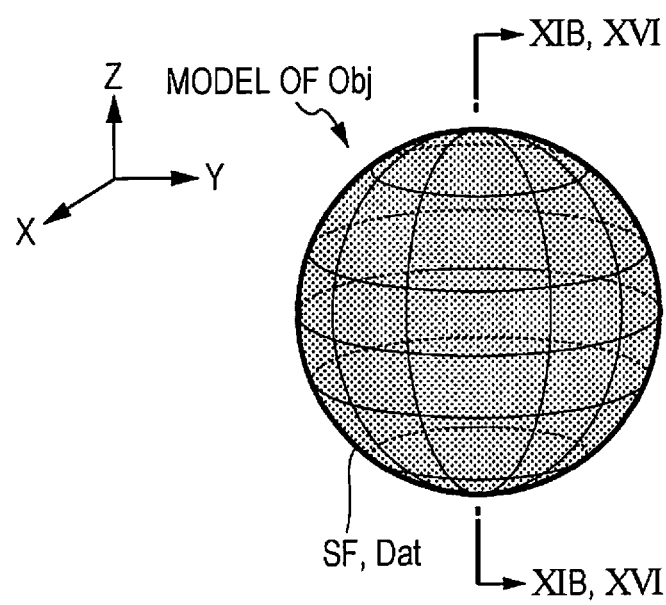
FIGS. 11A and 11B are diagrams for explaining a solid object.
Figure 11B:
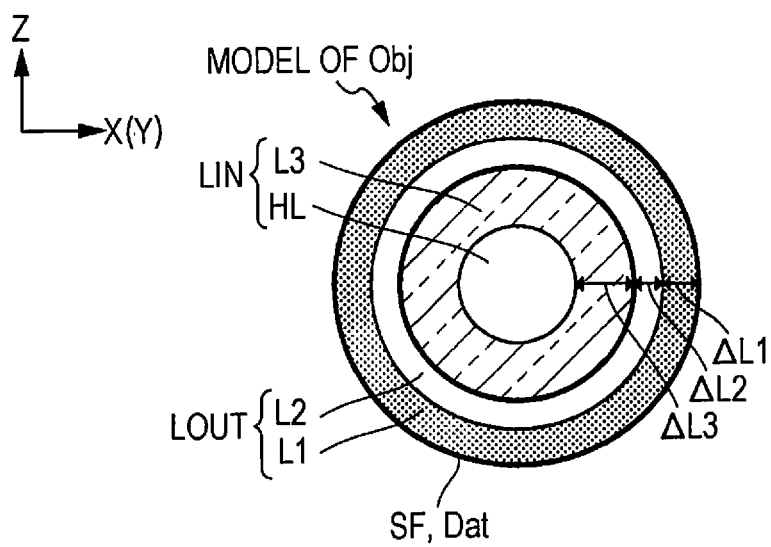

FIGS. 16A and 16B illustrate sections obtained when cutting a spherical solid object Obj corresponding to FIG. 11A on a plane parallel to the Z axis along a straight line XVI-XVI. In FIGS. 16A and 16B, blocks BL forming the colored layer L1 are hatched in a dark color, and blocks BL forming the shield layer L2 and the inner layer L3 are hatched in a light color.

As described above, in a case where the solid object Obj is shaped on the basis of the voxel data VD as in the solid object shaping apparatus related to the comparative example, the surface of the solid object Obj is constituted of only a plurality of normal blocks BLM as illustrated in FIG. 16A.

On the other hand, in a case where the solid object Obj is shaped on the basis of the designation data SD designating that the small block BLS or the large block BLL is formed in the target voxel Vx-TG as in the solid object shaping apparatus 1 according to the present embodiment, the surface of the solid object Obj is constituted of a plurality of small blocks BLS and a plurality of large blocks BLL in addition to a plurality of normal blocks BLM as illustrated in FIG. 16B. In other words, in the present embodiment, it is possible to shape the surface of the solid object Obj by using a block BL having a type which is appropriate for a shape of a model indicated by the model data Dat.

In a case where a normal block BLM is formed in one voxel Vx, the control portion 6 of the solid object shaping apparatus 1 sets values indicated by the waveform designation signal SI[m] supplied to the ejecting portion D[m] which ejects ink onto the one voxel Vx, to (b1, b2)=(1, 1), and controls the ejecting portion D[m] so that the first reference amount of ink is ejected from the ejecting portion D[m]. In this case, the control portion 6 supplies the control signal K designating that the ink ejected on the one voxel Vx is cured, in the normal curing mode, to the curing unit 61. Consequently, the solid object shaping apparatus 1 can form the normal block BLM with substantially the same size as the size of the voxel Vx in the one voxel Vx.

In a case where a small block BLS is formed in an upper face boundary voxel Vx-BDu, the control portion 6 sets values indicated by the waveform designation signal SI[m] supplied to the ejecting portion D[m] which ejects ink onto the upper face boundary voxel Vx-BDu, to (b1, b2)=(1, 0), and controls the ejecting portion D[m] so that the second reference amount of ink is ejected from the ejecting portion D[m]. In this case, the control portion 6 supplies the control signal K designating that the ink ejected on the upper face boundary voxel Vx-BDu is cured in the normal curing mode, to the curing unit 61. Consequently, the solid object shaping apparatus 1 can form the small block BLS with substantially a half size of the voxel Vx in the upper face boundary voxel Vx-BDu.

In a case where a large block BLL is formed in an adjacent voxel Vx-NB and a lower face boundary voxel Vx-BDd adjacent to a lower side of the adjacent voxel Vx-NB, the control portion 6 sets values indicated by the waveform designation signal SI[m] supplied to the ejecting portion D[m] which ejects ink onto the adjacent voxel Vx-NB, to (b1, b2)=(1, 1), and controls the ejecting portion D[m] so that the first reference amount of ink is ejected from the ejecting portion D[m]. In this case, the control portion 6 supplies the control signal K designating that the ink ejected on the adjacent voxel Vx-NB is cured in the slow curing mode, to the curing unit 61. Consequently, the solid object shaping apparatus 1 can form the large block BLL with the size larger than the size of the voxel Vx through slow curing of the first reference amount of ink ejected on the adjacent voxel Vx-NB so that the ink hangs down from the adjacent voxel Vx-NB to the upper side of the lower face boundary voxel Vx-BDd.

Meanwhile, as illustrated in FIGS. 14A and 14B or 16A and 16B, there is no voxel Vx under the lower face boundary voxel Vx-BDd. For this reason, in a case where a large block BLL is formed in the adjacent voxel Vx-NB and a part of the lower face boundary voxel Vx-BDd, there is the possibility that ink ejected on the adjacent voxel Vx-NB may fall in the −Z direction without remaining on the upper side of the lower face boundary voxel Vx-BDd. Even in a case where the ink does not fall, there is the possibility that, for example, the ink may hang down up to the lower half of the lower face boundary voxel Vx-BDd without remaining in the upper half of the lower face boundary voxel Vx-BDd, and thus a block larger than the large block BLL may be formed.

In order to prevent such a problem, for example, a support may be formed in a portion (for example, the lower half) of the lower face boundary voxel Vx-BDd in which the large block BLL is not formed. Alternatively, when ink is ejected onto the adjacent voxel Vx-NB, the ink may be ejected so as to come into contact with a block BL formed in a voxel Vx adjacent to the adjacent voxel Vx-NB in the same shaping body LY, and thus the ink may not hang down further downward than a desired position due to surface tension.

3. Conclusion of Embodiment

As described above, in the present embodiment, the surface of the solid object Obj is formed by using three types of blocks BL with different sizes, such as the normal block BLM with substantially the same size of the size of a voxel Vx, the small block BLS with the size smaller than the size of the voxel Vx, and the large block BLL with the size larger than the size of the voxel Vx. Thus, it is possible to shape the surface of the solid object Obj by using a block BL having a type which is appropriate for a shape of a model indicated by the model data Dat. Since the three types of blocks BL with different sizes are used, it is possible to shape the solid object Obj having a smooth surface shape with less roughness by reducing the possibility that irregularities may be visually recognized on the surface of the solid object Obj.

B. Modification Examples

The above-described embodiment may be variously modified. Specific modification aspects will be exemplified below. Two or more aspects which are arbitrarily selected from the following examples may be combined with each other as appropriate within the scope which does not cause contradiction to each other.

In modification examples described below, elements whose operations or functions are equivalent to those in the embodiment are given the same reference numerals in the above description, and a detailed description thereof will be omitted as appropriate.

Modification Example 1

In the above-described embodiment, a target voxel Vx-TG in which a small block BLS or a large block BLL is formed is specified on the basis of a boundary voxel Vx-BD, but the invention is not limited to such an aspect. For example, the target voxel Vx-TG may be specified on the basis of an edge voxel Vx-EG which is a boundary voxel Vx-BD whose two or more faces including at least one of an upper face and a lower face and at least one of four side faces correspond to a surface of a voxel assembly among boundary voxels Vx-BD.

The edge voxel Vx-EG is sorted into a lower face edge voxel Vx-EGd (an example of a "first edge voxel") and an upper face edge voxel Vx-EGu (an example of a "second edge voxel"). Here, the lower face edge voxel Vx-EGd is a lower face boundary voxel Vx-BDd whose lower face and at least one of four side faces correspond to a surface of a voxel assembly among lower face boundary voxels Vx-BDd. The upper face edge voxel Vx-EGu is an upper face boundary voxel Vx-BDu whose lower face and at least one of four side faces correspond to a surface of a voxel assembly among upper face boundary voxel Vx-BDu.

The designation data generation portion 93 according to the present modification example first selects boundary voxels Vx-BD and then specifies a lower face edge voxel Vx-EGd and an upper face edge voxel Vx-EGu among the boundary voxels Vx-BD. The designation data generation portion 93 specifies an adjacent voxel Vx-NB adjacent to an upper side of the lower face edge voxel Vx-EGd as a target voxel Vx-TG, and specifies the upper face edge voxel Vx-EGu as a target voxel Vx-TG.

In the same manner as in the above-described embodiment, in a case where the target voxel Vx-TG is the adjacent voxel Vx-NB, the designation data generation portion 93 determines that a large block BLL is to be formed in the adjacent voxel Vx-NB and a part of the lower face edge voxel Vx-EGd. In a case where the target voxel Vx-TG is the upper face edge voxel Vx-EGu, the designation data generation portion 93 determines that a small block BLS is to be formed in the upper face edge voxel Vx-EGu.

As described above, in the present modification example, when compared with a case where a normal block BLM is formed in each voxel Vx as in the comparative example, a volume (a volume occupied by the solid object Obj) occupied by a block BL in the edge voxel Vx-EG corresponding to a projection of irregularities of the surface of the solid object Obj can be reduced. For this reason, it is possible to make the irregularities of the surface of the solid object Obj invisible.

Modification Example 2

In the above-described embodiment and modification example, as exemplified in FIG. 11B, the solid object Obj shaped by the solid object shaping apparatus 1 includes the outer region LOUT having the colored layer L1 and the shield layer L2, and the inner region LIN having the inner layer L3 and the hollow portion HL, but the invention is not limited to such an aspect, and the solid object shaping apparatus 1 may shape a solid object Obj having at least the colored layer L1.

In the solid object Obj, a clear layer which is formed by clear ink and has a predetermined thickness may be provided outside the colored layer L1 so as to cover the colored layer L1.

Modification Example 3

In the above-described embodiment and modification examples, ink which can be ejected by the solid object shaping apparatus 1 is a total of six types of ink including five types of shaping ink and a single type of support ink, but the invention is not limited to such an aspect. For example, the solid object shaping apparatus 1 may eject at least one type of shaping ink.

Modification Example 4

In the above-described embodiment and modification examples, the process of selecting a boundary voxel Vx-BD in step S300, and the process of specifying the type of block BL to be formed in a target voxel Vx-TG in step S310 are performed by the designation data generation portion 93 provided in the host computer 9, but the invention is not limited to such an aspect, and the processes may be performed by the control portion 6. In a case where the processes in steps S300 and S310 are performed by the control portion 6, the designation data SD generated by the designation data generation portion 93 may designate formation of a dot with the same content as the content indicated by the voxel data VD.

In other words, even in a case where a normal block BLM is designated to be formed in each voxel Vx, if the voxel Vx corresponds to a target voxel Vx-TG, the control portion 6 according to the present modification example may control an operation of the head unit 3 so that a small block BLS or a large block BLL is formed in the voxel Vx. In this case, the host computer 9 may supply the designation data SD and the model data Dat to the control portion 6.

Modification Example 5

In the above-described embodiment and modification examples, the solid object shaping apparatus 1 shapes the solid object Obj by laminating the shaping body LY which is formed by curing shaping ink, but the invention is not limited to such an aspect. For example, powders which are spread in a layer state may be hardened by curable shaping ink so as to form the shaping body LY, and the solid object Obj may be shaped by laminating the formed shaping body LY.

In this case, the solid object shaping apparatus 1 may include a powder layer forming portion (not illustrated) which forms a powder layer PW by spreading a powder on the shaping platform 45 with a predetermined thickness $\Delta Z$, and a powder removing portion (not illustrated) which removes powders (powders other than powders hardened by the shaping ink) which does not constitute a solid object Obj after forming the solid object Obj. Hereinafter, a powder layer PW for forming a shaping body LY[q] is referred to as a powder layer PW[q].

Figure 17:
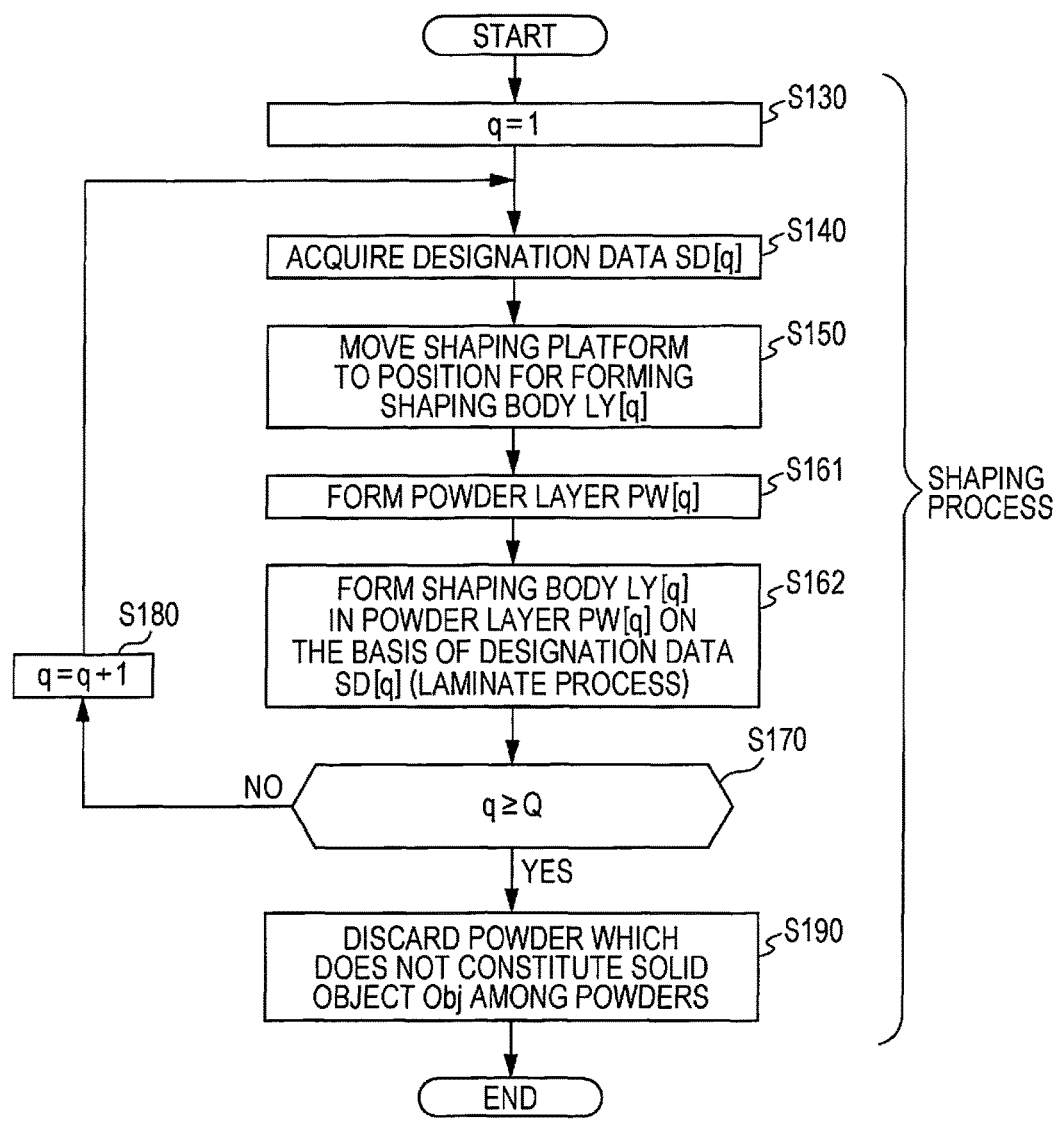
FIG. 17 is a flowchart illustrating a data generation process and a shaping process according to Modification Example 5.

FIG. 17 is a flowchart illustrating an example of an operation of the solid object shaping system 100 in a case where a shaping process according to the present modification example is performed. The shaping process according to the present modification example, illustrated in FIG. 17, is the same as the shaping process according to the embodiment illustrated in FIG. 10 except that processes in steps S161 and S162 are performed instead of step S160, and a process in step S190 is performed if a determination result is affirmative in step S170.

As illustrated in FIG. 17, the control portion 6 according to the present modification example controls an operation of each portion of the solid object shaping apparatus 1 so that the powder layer forming portion forms the powder layer PW[q] (step S161).

The control portion 6 according to the present modification example controls an operation of each portion of the solid object shaping apparatus 1 so that the shaping body LY[q] is formed by forming a dot in the powder layer PW[q] on the basis of the designation data SD[q] (step S162). Specifically, first, in step S162, the control portion 6 generates the waveform designation signal SI by using the designation data SD[q], and controls an operation of the head unit 3 by using the generated waveform designation signal SI so that shaping ink or support ink is ejected onto the powder layer PW[q]. Next, the control portion 6 controls an operation of the curing unit 61 so that powders of a portion of the powder layer PW[q] in which a dot is formed are hardened by curing the dot formed by the ink ejected on the powder layer PW[q]. Consequently, powders of the powder layer PW[q] can be hardened by ink, and thus the shaping body LY[q] can be formed.

The control portion 6 according to the present modification example controls an operation of the power removing portion so that powders which do not constitute the solid object Obj are removed after the solid object Obj is shaped (step S190).

Figure 2:
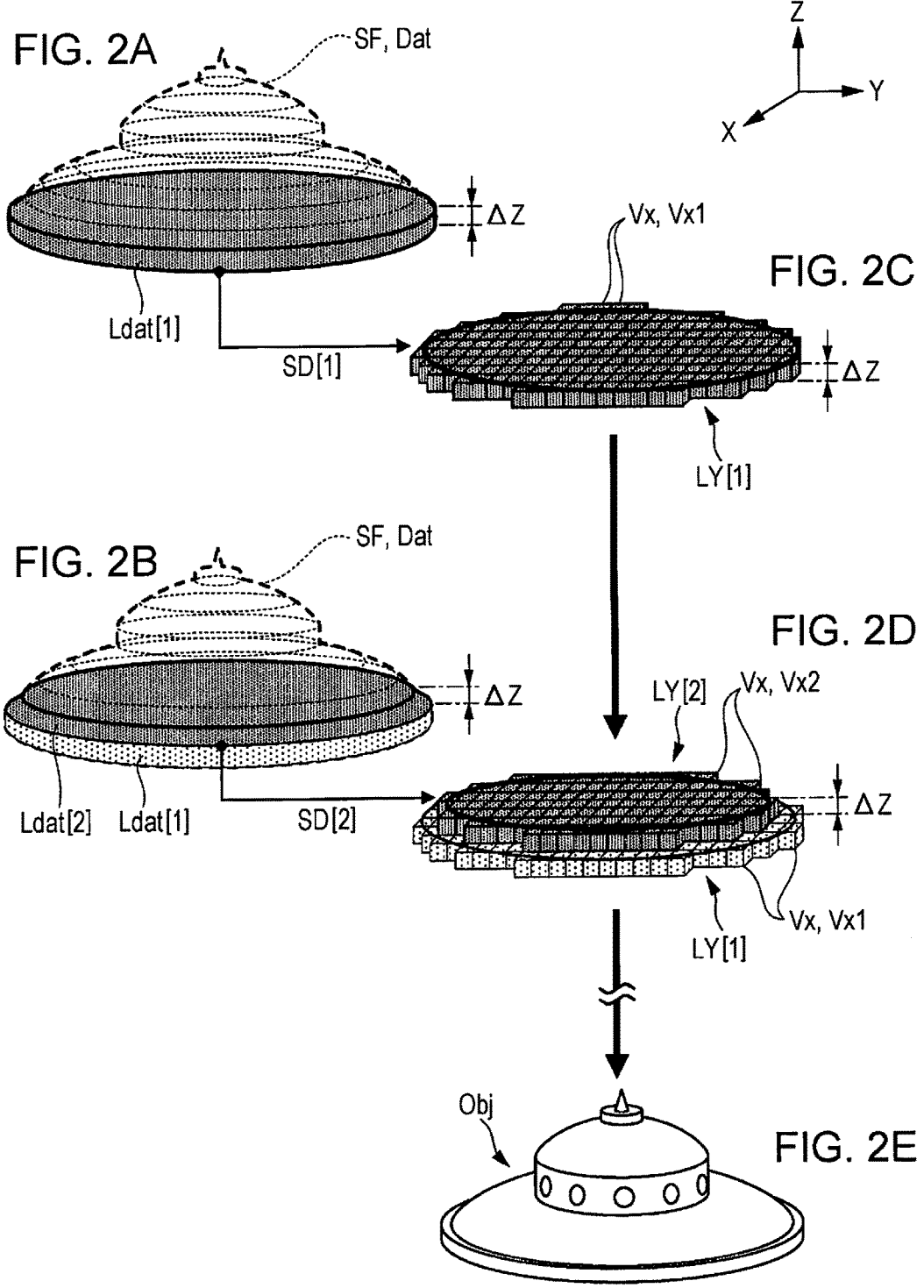
FIGS. 18A to 18D2 are diagrams for explaining shaping of a solid object in a solid object shaping system related to Modification Example 5.
Figure 18:
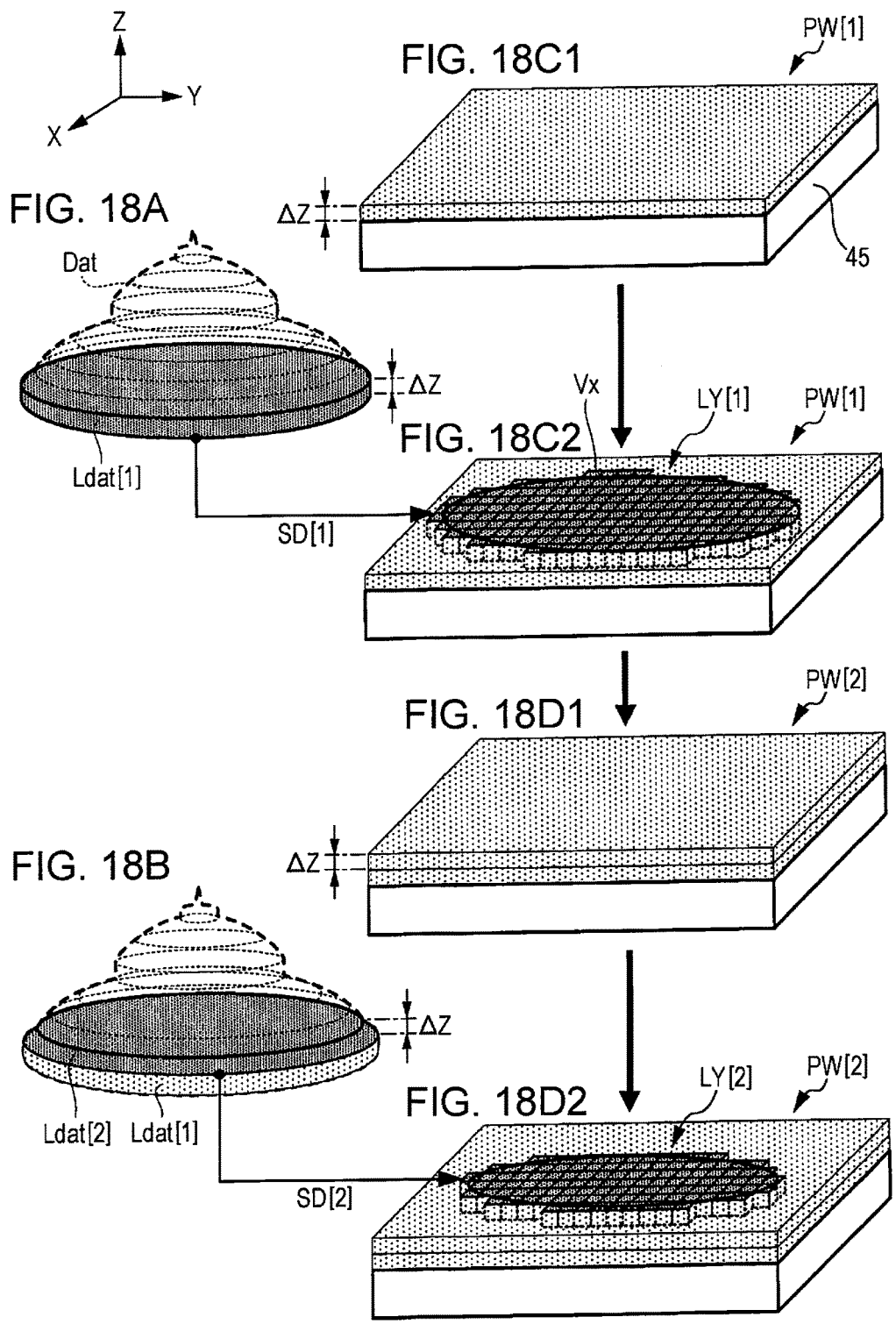

FIGS. 18A to 18D2 are diagrams for explaining a relationship among the model data Dat, the section model data Ldat[q], the designation data SD[q], the powder layer PW[q], and the shaping body LY[q] according to the present modification example.

FIGS. 18A and 18B are the same as FIGS. 2A) and 2B), and exemplify section model data Ldat[1] and Ldat[2]. Also in the present modification example, the section model data Ldat[q] is generated by slicing a model of a solid object Obj indicated by the model data Dat, the designation data SD[q] is generated on the basis of the section model data Ldat[q], and the shaping body LY[q] is formed by a dot which is formed on the basis of the waveform designation signal SI, the waveform designation signal SI being generated by using the designation data SD[q]. Hereinafter, with reference to FIGS. 18C1 to 18D2, a description will be made of formation of the shaping body LY[q] according to the present modification example by exemplifying the shaping bodies LY[1] and LY[2].

As illustrated in FIG. 18C1, the control portion 6 controls an operation of the powder layer forming portion so that a powder layer PW[1] with a predetermined thickness $\Delta Z$ is formed before forming the shaping body LY[1] (refer to the above-described step S161).

Next, as illustrated in FIG. 18C2, the control portion 6 controls an operation of each portion of the solid object shaping apparatus 1 so that the shaping body LY[1] is formed in the powder layer PW[1] (refer to the above-described step S162). Specifically, first, the control portion 6 controls an operation of the head unit 3 on the basis of the waveform designation signal SI which is generated by using the designation data SD[1], and thus dots are formed by ejecting ink onto the powder layer PW[1]. Next, the control portion 6 controls an operation of the curing unit 61 so that the dots formed in the powder layer PW[1] are cured, and thus the shaping body LY[1] is formed by hardening powders of a portion in which the dots are formed.

Thereafter, as illustrated in FIG. 18D1, the control portion 6 controls the powder layer forming portion so that a powder layer PW[2] with the predetermined thickness $\alpha Z$ is formed on the powder layer PW[1] and the shaping body LY[1]. As illustrated in FIG. 18D2, the control portion 6 controls an operation of each portion of the solid object shaping apparatus 1 so that the shaping body LY[2] is formed.

As mentioned above, the control portion 6 controls execution of the laminate process of forming the shaping body LY[q] in the powder layer PW[q] on the basis of the waveform designation signal SI which is generated by using the designation data SD[q], and shapes the solid object Obj by laminating the shaping body LY[q].

Figure 19:
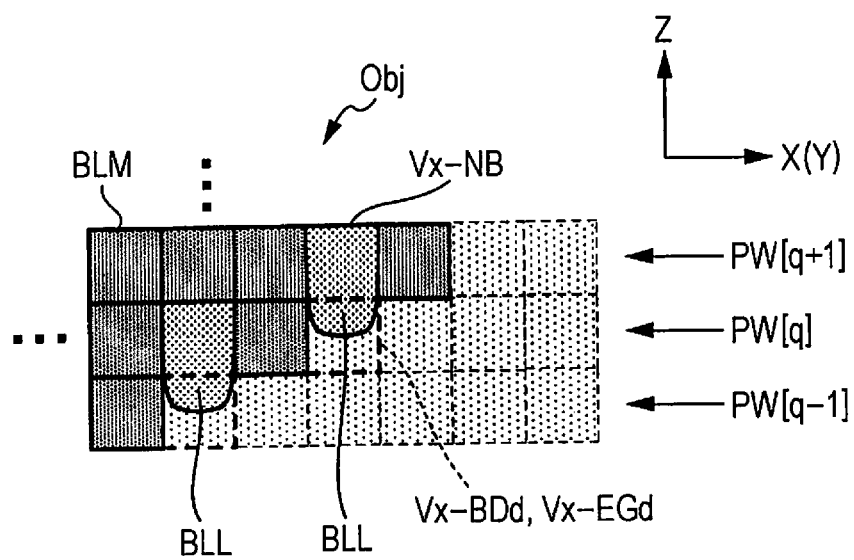
FIG. 19 is a diagram for explaining a solid object related to Modification Example 5.

FIG. 19 is a diagram for explaining a case where blocks BL (a small block BLS and a large block BLL) other than a normal block BLM are formed in a target voxel Vx-TG in the present modification example.

As illustrated in FIG. 19, in the same manner as in the above-described embodiment and modification examples, in a case where a target voxel Vx-TG is an adjacent voxel Vx-NB on an upper side of a lower face boundary voxel Vx-BDd (or a lower face edge voxel Vx-EGd), a solid object shaping apparatus according to the present modification example ejects the first reference amount of ink onto the target voxel Vx-TG, and cures the ejected ink in the slow curing mode. In a case where the ink is cured in the slow curing mode, when compared with a case of the normal curing mode, time required for the ink ejected on the powder layer PW to be cured is lengthened, and thus the ink ejected on the powder layer PW penetrates deep into the powder layer PW. For this reason, in the solid object shaping apparatus according to the present modification example, the first reference amount of ink is cured in the slow curing mode so as to penetrate from the adjacent voxel Vx-NB which is the target voxel Vx-TG up to a part of the lower face boundary voxel Vx-BDd (or the lower face edge voxel Vx-EGd), and thus a large block BLL can be formed.

If the target voxel Vx-TG is an upper face boundary voxel Vx-BDu (or an upper face edge voxel Vx-EGu), a dot is required to be formed in, for example, the lower part of the target voxel Vx-TG. For this reason, in the solid object shaping apparatus according to the present modification example, ink may be ejected at a higher speed, for example, in a case where the second reference amount of ink is ejected onto the upper face boundary voxel Vx-BDu or the upper face edge voxel Vx-EGu than, for example, in a case where the ink is ejected onto other voxels Vx.

Modification Example 6

In the above-described embodiment and modification examples, ultraviolet curable ink has been described as an example of a liquid, but the invention is not limited to such an aspect, and a liquid may be a curable liquid such as curable ink which is cured by a predetermined action. For example, the liquid may be heat curable ink which is cured by being heated, and may be heat fusible ink which is cured by being cooled.

In the above-described embodiment, the curing unit 61 is a light source for applying ultraviolet rays, but the invention is not limited to such an aspect. The curing unit 61 may be one which can cure a curable liquid and can operate in a plurality of curing modes including the normal curing mode and the slow curing mode so as to control the extent of curing.

For example, if a liquid is heat curable ink, a superheater for heating the ink ejected from the ejecting portion D may be used as the curing unit 61. In this case, for example, the curing unit 61 may lower the extent of curing by making an amount of heat applied to the ink in the slow curing mode smaller than in the normal curing mode. For example, the curing unit 61 may lower the extent of curing by making overheating time (curing time) for overheating ink in the slow curing mode shorter than in the normal curing mode.

In the above-described embodiment, the curing unit 61 can perform curing in the normal curing mode and the slow curing mode and can thus switch the extent of curing between two levels, but the invention is not limited to such an aspect, and the extent of curing may be finely switched among three or more levels. For example, the curing unit 61 may operate not only in the normal curing mode and the slow curing mode but also in a fast curing mode in which the extent of curing is higher than in the two curing modes.

In a case where the extent of curing can be finely switched by the curing unit 61, the size of a dot formed in a voxel Vx can be finely controlled without changing an amount of liquid such as ink ejected from the ejecting portion D. For this reason, it is possible to shape a solid object Obj having a smooth surface with less roughness.

In a case where heat fusible ink made of thermoplastic resin is used as a liquid, ink is preferably ejected in a state of being heated in the ejecting portion D. Thus, in this case, the ejecting portion D according to the present modification example may perform so-called thermal type ink ejection in which a heat source (not illustrated) provided in the cavity 320 generates heat so as to generate foams in the cavity 320, and thus ink is ejected due to an increase in pressure inside the cavity 320.

Modification Example 7

In the above-described embodiment and modification examples, an amount of liquid which can be ejected from each ejecting portion D is the first reference amount or the second reference amount, but the invention is not limited to such an aspect, and an amount of liquid which can be ejected from each ejecting portion D may be controlled in three or more stages. For example, in a case where a liquid is cured in one curing mode, the solid object shaping apparatus 1 may form three types of dots with different sizes, such as a small dot filling ⅓ of the size of a voxel Vx, a medium dot filling ⅔ of the size of the voxel Vx, and a large dot filling the entire voxel Vx. In this case, since the size of a dot formed in a voxel Vx can be finely controlled, it is possible to shape a solid object Obj having a smooth surface with less roughness.

Modification Example 8

In the above-described embodiment and modification examples, the designation data generation portion 93 is provided in the host computer 9, but the invention is not limited to such an aspect, and the designation data generation portion 93 may be provided in the solid object shaping apparatus 1. For example, the designation data generation portion 93 may be installed as a functional block which is realized when the control portion 6 operates according to a control program. In other words, the designation data generation portion 93 may be provided in the control portion 6.

In a case where the solid object shaping apparatus 1 includes the designation data generation portion 93, the solid object shaping apparatus 1 may generate the designation data SD on the basis of the model data Dat which is supplied from an external device of the solid object shaping apparatus 1, and may shape a solid object Obj on the basis of the waveform designation signal SI which is generated by using the generated designation data SD.

Modification Example 9

In the above-described embodiment and modification examples, the solid object shaping system 100 includes the model data generation portion 92, but the invention is not limited to such an aspect, and the solid object shaping system 100 may not include the model data generation portion 92. In other words, the solid object shaping system 100 may shape a solid object Obj on the basis of the model data Dat supplied from an external device of the solid object shaping system 100.

Modification Example 10

In the above-described embodiment and modification examples, the driving waveform signal Com is a signal having the waveforms PL1 and PL2, but the invention is not limited to such an aspect. For example, the driving waveform signal Com may be any signal as long as the signal has a waveform which can cause ink in an amount corresponding to a dot having at least one kind of size to be ejected from the ejecting portion D. For example, the driving waveform signal Com may have waveforms depending on the type of ink.

In the above-described embodiment and modification examples, the number of bits of the waveform designation signal SI[m] is 2 bits, but the invention is not limited to such an aspect. The number of bits of the waveform designation signal SI[m] may be defined as appropriate depending on the number of kinds of sizes of dots formed by ink ejected from the ejecting portion D.

What is claimed is:

1. A solid object shaping apparatus comprising:
a head unit that ejects a liquid;
a curing unit that cures the liquid ejected from the head unit; and
a control portion that controls the head unit and the curing unit to shape a solid object by using a plurality of blocks that are formed by the cured liquid, and
the control portion controlling the curing unit to cure the liquid in a plurality of curing modes including a first curing mode in which the liquid is cured so that a first block with a first size is formed by a first reference amount of liquid ejected from the head unit, and a second curing mode in which the liquid is cured so that a second block with a second size in which a surface area is larger than a surface area in the first size is formed by using the first reference amount of liquid ejected from the head unit,
to form the second block, among a plurality of voxels with which a model for designating a shape of the solid object is approximated, which constitute a voxel assembly, and each of which is a virtual rectangular parallelepiped with the first size, the control portion controlling the head unit to eject the first reference amount of the liquid to a voxel that is adjacent to an upper face of a first edge voxel, the first edge voxel having six faces that include the upper face and a lower face facing in an opposite direction to the upper face in a vertical direction of the solid object, the lower face and at least one face of the first edge voxel, which is different from the upper and lower faces, constituting an outer surface of the voxel assembly, and the control portion controlling the curing unit to cure the liquid ejected to the voxel in the second curing mode such that the liquid ejected to the voxel hangs down toward the first edge voxel and such that the second block formed of the liquid elected to the voxel is formed in the voxel and a part of the first edge voxel.

2. The solid object shaping apparatus according to claim 1,
wherein the head unit ejects the first reference amount of liquid, or ejects a second reference amount of liquid smaller than the first reference amount of liquid to form a third block, and
wherein the control portion controls the head unit to eject the liquid such that the third block formed by using the second reference amount of liquid is provided in a part of a second edge voxel among the plurality of voxels, and the second edge voxel has six faces including two or more faces that constitute a surface of the voxel assembly.

3. The solid object shaping apparatus according to claim 1,
wherein the liquid is cured when irradiated with light having a predetermined wavelength,
wherein the curing unit irradiates the liquid ejected from the head unit with the light having the predetermined wavelength, and
wherein the control portion controls the curing unit such that the intensity of light applied by the curing unit in the first curing mode is higher than the intensity of light applied by the curing unit in the second curing mode.

4. The solid object shaping apparatus according to claim 1,
wherein the liquid is cured by being heated,
wherein the curing unit heats the liquid ejected from the head unit, and
wherein the control portion controls the curing unit such that an amount of heat applied to the liquid ejected from the head unit by the curing unit in the first curing mode is larger than an amount of heat applied to the liquid ejected from the head unit by the curing unit in the second curing mode.

5. The solid object shaping apparatus according to claim 1,
wherein the control portion controls the curing unit such that time to cure the liquid ejected from the head unit by the curing unit in the first curing mode is longer than time to cure the liquid ejected from the head unit by the curing unit in the second curing mode.

* * * * *